United States Patent
Hoshino et al.

(10) Patent No.: US 8,654,752 B2
(45) Date of Patent: Feb. 18, 2014

(54) RADIO COMMUNICATION DEVICE AND RADIO COMMUNICATION METHOD

(75) Inventors: Masayuki Hoshino, Kanagawa (JP); Seigo Nakao, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 13/057,562

(22) PCT Filed: Jun. 23, 2009

(86) PCT No.: PCT/JP2009/002874
§ 371 (c)(1),
(2), (4) Date: Feb. 4, 2011

(87) PCT Pub. No.: WO2010/016183
PCT Pub. Date: Feb. 11, 2010

(65) Prior Publication Data
US 2011/0134901 A1    Jun. 9, 2011

(30) Foreign Application Priority Data

Aug. 5, 2008  (JP) ................. P2008-202126
Dec. 19, 2008 (JP) ................. P2008-324610

(51) Int. Cl.
*H04L 27/06* (2006.01)

(52) U.S. Cl.
USPC ............................. 370/344; 375/267; 455/101

(58) Field of Classification Search
None
See application file for complete search history.

(56) References Cited

U.S. PATENT DOCUMENTS

| 2006/0013168 A1 | 1/2006 | Agrawal et al. |
| 2006/0013186 A1 | 1/2006 | Agrawal et al. |
| 2006/0013325 A1 | 1/2006 | Agrawal et al. |
| 2006/0018269 A1 | 1/2006 | Agrawal et al. |

(Continued)

FOREIGN PATENT DOCUMENTS

| JP | 2008-502223 A | 1/2008 |
| JP | 2008-118650 A | 5/2008 |

(Continued)

OTHER PUBLICATIONS

Decision on Grant Patent for Invention for Application No. 2011104064/07 dated Jan. 10, 2013.
International Search Report for Application No. PCT/JP2009/002874; Jul. 21, 2009.
Ericsson, et al., "Refinement on MIMO Precoding Schemes", 3GPP TSG RAN WG1 Meeting #52bis, Mar. 31, 2008, pp. 1-4.

(Continued)

*Primary Examiner* — Chi Pham
*Assistant Examiner* — Mohammad Adhami
(74) *Attorney, Agent, or Firm* — Pearne & Gordon LLP

(57) ABSTRACT

It is possible to obtain the diversity effect in a plurality of slots while preventing complication of a scheduler or inefficient use of resources, to eliminate the phenomenon in which SINR significantly decreases in a specific slot, and to avoid deterioration of demodulation performance. In a radio communication system which performs transmission in a sub-frame unit having two slots temporally continuously arranged, when pre-coding is performed by multiplying a signal to be output to a plurality of antennas by a pre-coding weight, CDD is used to shift a phase such that the phase in the pre-coding weight is cyclically changed on the frequency axis. The phase shift amount to be applied by the CDD is set to change by $2\pi$ in an allocated resource block (1RB) of the local device, and PVS is applied such that the phase shift amount differs by $\pi$ between the weight W0 of the first half slot and the weight W1 of the second half slot in the sub-frame.

10 Claims, 15 Drawing Sheets

(A)

(B)

(56) References Cited

U.S. PATENT DOCUMENTS

| | | |
|---|---|---|
| 2006/0018279 A1 | 1/2006 | Agrawal et al. |
| 2006/0270360 A1 | 11/2006 | Han et al. |
| 2007/0060183 A1 | 3/2007 | Moulsley et al. |
| 2008/0080637 A1* | 4/2008 | Khan et al. .............. 375/267 |
| 2008/0117999 A1* | 5/2008 | Kadous et al. .............. 375/267 |
| 2008/0132282 A1 | 6/2008 | Liu et al. |
| 2008/0198902 A1* | 8/2008 | Malladi .............. 375/134 |
| 2008/0247364 A1* | 10/2008 | Kim et al. .............. 370/336 |
| 2009/0135925 A1 | 5/2009 | Hamaguchi et al. ......... 375/260 |
| 2009/0213944 A1* | 8/2009 | Grant .............. 375/260 |
| 2009/0213955 A1 | 8/2009 | Higuchi et al. |
| 2009/0304120 A1 | 12/2009 | Agrawal et al. |
| 2010/0020893 A1* | 1/2010 | Hoshino et al. .............. 375/267 |
| 2010/0111211 A1 | 5/2010 | Han et al. |
| 2011/0019770 A1* | 1/2011 | Gorokhov et al. .......... 375/296 |

FOREIGN PATENT DOCUMENTS

| | | |
|---|---|---|
| RU | 2310987 C2 | 11/2007 |
| WO | 2006/106613 A1 | 10/2006 |
| WO | 2006/129958 A1 | 12/2006 |
| WO | 2008050745 A1 | 5/2008 |

OTHER PUBLICATIONS

Panasonic et al., "Way forward on the Cyclic Shift Hopping for PUCCH", 3GPP TSG RAN WG1 Meeting #52; Feb. 11, 2008, pp. 1-2.

Samsung, et al., "UL hopping in PUSCH", 3GPP TSG RAN WG1 Meeting #51; Nov. 5, 2007, pp. 1-3.

NTT DoCoMo, et al., Downlink MIMO Scheme in E-UTRA, 3GPP TSG RAN WG1 Meeting #46; Aug. 28, 2006, pp. 1-11.

* cited by examiner

FIG. 4
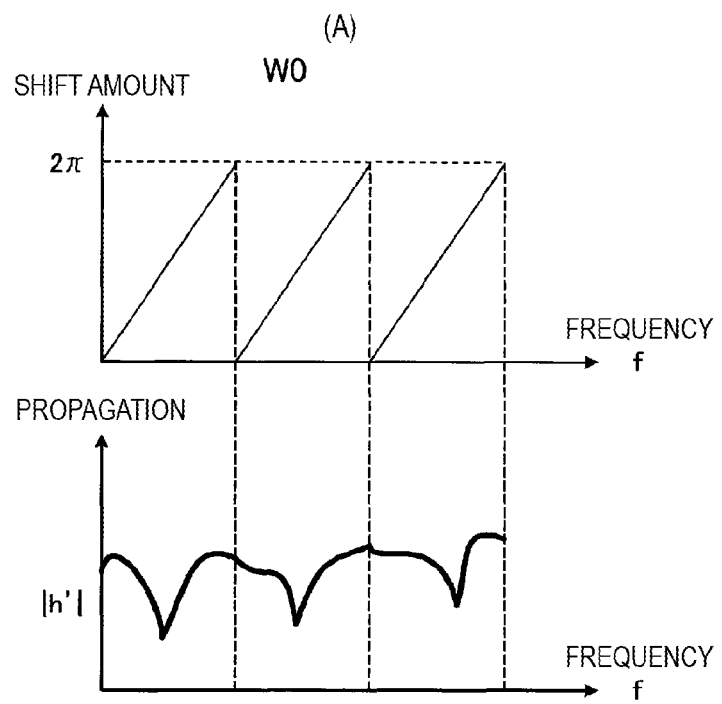
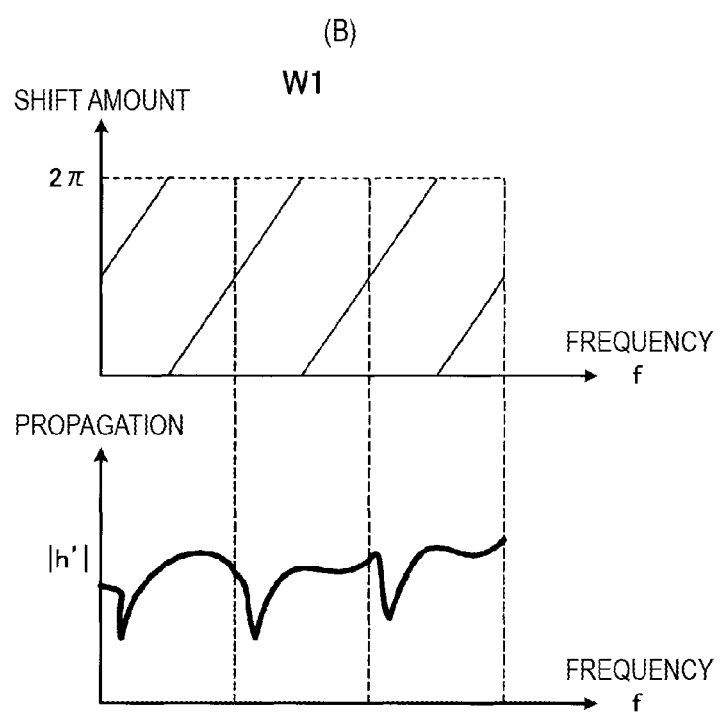

FIG. 13

| SPACE HOPPING | CRC MASK FOR SPACE HOPPING NOTIFICATION $\langle x_{AS,0}, x_{AS,1}, \ldots, x_{AS,15} \rangle$ |
|---|---|
| OFF | $\langle 0,0,0,0,0,0,0,0,0,0,0,0,0,0,0,0 \rangle$ |
| ON | $\langle 0,0,0,0,0,0,0,0,0,0,0,0,0,0,0,1 \rangle$ |

RADIO COMMUNICATION DEVICE AND RADIO COMMUNICATION METHOD

TECHNICAL FIELD

The present invention relates to a radio communication device and a radio communication method which are applicable to a radio communication system, such as a cellular system.

BACKGROUND ART

In a radio communication system for communication between mobile objects, such as mobile phones, studies have been done to improve a data rate using various multiplexing techniques. In a recent radio communication system for mobile communication, for example, a frequency domain multiplexing scheme, such as OFDM (Orthogonal Frequency Division Multiplexing) or SC-FDMA (Single-Carrier Frequency Division Multiple Access), which is used for a wireless LAN or digital terrestrial broadcasting. With the use of a frequency domain multiplexing scheme, it becomes possible to suppress deterioration of transmission quality due to fading and to achieve high-speed and high-quality radio transmission. In the frequency domain multiplexing scheme, such as OFDM or SC-FDMA, frequency hopping (FH) may be adopted so as to improve fading resistance. Frequency hopping is a technique for changing a frequency domain to be used from among plural frequency domains at a time interval, making it possible to prevent the use of only a specific frequency domain and to suppress performance deterioration due to frequency-selective fading.

In a cellular system for mobile communication, in an uplink (UL) where upstream communication is performed from a user terminal to a base station, in order to obtain the frequency-diversity effect, a frequency hopping method has been studied in which data is arranged in different frequency resources between the first half slot and the second half slot of the same sub-frame (for example, see NPL 1). FIG. 17 is a diagram showing an operation example of frequency hopping in an uplink. In FIG. 17, (A) shows the allocation of frequency resources, and (B) shows a channel gain $|h|^2$ at that time.

In this example, FIG. 17(A) shows a case where the allocation unit of frequency resource is a resource block (RB), and PUSCH1 which is PUSCH (Physical Uplink Shared Channel) is allocated to a user 1 corresponding to a first user terminal and PUSCH2 is allocated to a user 2 corresponding to a second user terminal. In the drawing, null represents an empty resource in which no data is allocated. Frequency hopping is performed such that, for the channels PUSCH1 and PUSCH2 of the users, resource blocks having different frequencies are respectively allocated to the slots. In this case, from the viewpoint of the channel gain, as shown in FIG. 17(B), different resource blocks are allocated between the first half slot and the second half slot for each user, such that the SINR (Signal-to-Interference plus Noise power Ratio) differs between the slots. Therefore, signals are transmitted using both a low-SINR portion and a high-SINR portion, such that it is possible to average the SINR and to obtain the frequency diversity effect compared to a case where signals are transmitted using only a specific frequency resource.

Although there is an advantage from the viewpoint of performance because of averaging of the SINR through frequency hopping, there are the following problems from the viewpoint of control. First, there is a problem in that the complexity of a scheduler increases so as to search for a pair of user terminals, like the user 1 and the user 2 for hopping in the example of FIG. 17. There is also a problem in that, if the scheduler has not found a pair for hopping, an empty frequency resource (in FIG. 17, a place indicated by null) occurs, causing inefficient use of resources.

With regard to the above-described problems, as a simply resolution of the related art, PVS (Pre-coding vector switching) is applicable. Pre-coding is a transmission beam technique in which, in the case of MIMO (Multiple Input Multiple Output), at the time of transmission from plural antennas, weighted data is transmitted from each antenna to form a beam. PVS is a technique in which the weight (Pre-coding weight) of each antenna at the time of pre-coding is changed and a pre-coding vector is switched. PVS has been studied in a downlink (DL) where downstream communication is performed from the base station to the user terminal (for example, see NPL 2). It is assumed that PVS is applied to the first half slot and the second half slot in the uplink.

FIG. 18 is a diagram showing an operation example of space hopping to which PVS is applied in an uplink. In FIG. 18, (A) shows the allocation of frequency resources and allocation of a pre-coding weight in each frequency resource, and (B) shows a channel gain $|h|^2$ at that time. In this case, the same resource block may be used without changing the frequency resource allocated to each user. In the example of FIG. 18(A), for the first user terminal PUSCH1, different pre-coding weights, such as weights W0 and W1, are applied between the slots. Thus, switching of frequency resource allocation is eliminated, making it possible to resolve the problems in the above-described frequency hopping. In this case, from the viewpoint of the channel gain, as shown in FIG. 18(B), the SINR differs between the first half slot and the second half slot for each user, obtaining the space diversity effect. However, focusing on performance again, there is a problem in that, like the first half slot shown in FIG. 18(B), the SINR of a slot allocated with an inappropriate pre-coding weight significantly decreases, making it difficult to perform demodulation.

CITATION LIST

Non-Patent Literature

NPL 1: 3GPP TSG RAN WG1 #51, R1-074789, Samsung, NTT DoCoMo, Qualcomm, "UL hopping in PUSCH", Nov. 5-9, 2007

NPL 2: 3GPP TSG RAN WG1 #46, R1-062105, NTT DoCoMo, Fujitsu, Institute for Infocomm Research, Mitsubishi Electric, NEC, Sharp, "Downlink MIMO Scheme in E-UTRA", Aug. 28-Sep. 1, 2006

SUMMARY OF INVENTION

Technical Problem

As described above, in a radio communication system having a frame structure with plural continuous slots on a time axis in one transmission time unit, like an uplink of a cellular system, when frequency hopping is performed to allocate different frequency resources to slots, there is a problem in that the complexity of the scheduler increases so as to search for the pair of user terminals for hopping. When the scheduler has not found the pair for hopping, there is a problem in that an empty frequency resource occurs, causing inefficient use of resources.

In contrast, when PVS is applied to allocate different pre-coding weights to the slots, the problems related to the frequency hopping can be resolved; however, there is a problem in that the SINR of a slot with an inappropriate pre-coding weight allocated significantly decreases and demodulation becomes difficult.

The invention has been finalized in consideration of the above-describe situation, and an object of the invention is to provide a radio communication device and a radio communication method capable of obtaining the diversity effect in a plurality of slots while preventing complication of a scheduler or inefficient use of resources, eliminating the phenomenon in which SINR significantly decreases in a specific slot, and avoiding deterioration of demodulation performance.

Solution to Problem

A first aspect of the invention provides a radio communication device for use in a radio communication system, which performs transmission on a sub-frame basis having a first slot and a second slot temporally continuously arranged. The radio communication device includes a pre-coding multiplication section which performs pre-coding to form a predetermined beam by multiplying a signal to be output to a plurality of antennas by a pre-coding weight, and uses cyclic delay diversity to shift a phase such that the phase in the pre-coding weight is cyclically changed on a frequency axis, a phase shift amount instruction section which instructs that a phase shift amount to be applied by the pre-coding multiplication section is changed by $2\pi$ in an allocated frequency bandwidth of the local device, and assigns the phase shift amount for the pre-coding multiplication section such that the phase shift amount differs by $\pi$ between the first slot and the second slot in an allocated sub-frame of the local device, and a transmitting section which transmits a transmission signal including the signal subjected to the pre-coding to a receiving device as the other communication party.

Therefore, it is possible to perform pre-coding with CDD and PVS applied, and it becomes possible to switch the propagation condition in a slot unit between a plurality of slots to obtain the space diversity effect and the frequency diversity effect. In this case, it is possible to prevent complication of a scheduler or inefficient use of resources, to eliminate the phenomenon in which SINR significantly decreases in a specific slot, and to avoid deterioration of demodulation performance.

According to a second aspect of the invention, in the above-described radio communication device, the transmitting section may perform communication based on SC-FDMA, and the phase shift amount instruction section may assign the phase shift amount such that the phase shift amount differs between SC-FDMA symbols.

Therefore, it becomes possible to perform pre-coding with CDD and PVS applied and to switch the propagation condition between the symbols, obtaining the space diversity effect and the frequency diversity effect.

According to a third aspect of the invention, in the above-described radio communication device, the phase shift amount instruction section may assign the phase shift amount such that the phase shift amount differs by $\pi$ between an odd-numbered symbol and an even-numbered symbol of the SC-FDMA symbols. Therefore, the propagation condition is switched for a time comparatively shorter than a symbol unit, obtaining a stronger diversity effect.

According to a fourth aspect of the invention, in the above-described radio communication device, the phase shift amount instruction section may assign the phase shift amount such that the phase shift amount is changed in a stepwise manner between the SC-FDMA symbols. Therefore, the propagation condition is switched in a stepwise manner between the symbols, obtaining a stronger diversity effect.

According to a fifth aspect of the invention, the above-described radio communication device may further include a control signal demodulation section which demodulates a control signal including space hopping information for directing space hopping through the pre-coding. The phase shift amount instruction section and the pre-coding multiplication section may perform the pre-coding to execute the space hopping in generating the transmission signal on the basis of the space hopping information.

Therefore, it is possible to perform the pre-coding on the basis of the space hopping information of the control signal to generate a transmission signal which executes space hopping.

According to a sixth aspect of the invention, in the radio communication device, the pre-coding may use pre-coding weights with different amplitudes between transmitting antennas. Therefore, it becomes possible to randomize interference components to be applied to another radio communication device which is adjacent in the time domain.

According to a seventh aspect of the invention, in the above-described radio communication device, the pre-coding weight to be applied by the pre-coding multiplication section may be applied such that the amplitude and delay amount in the pre-coding weight differ between the first slot and the second slot. Therefore, it becomes possible to randomize interference components to be applied to another radio communication device which is adjacent in the time domain.

An eighth aspect of the invention provides a radio communication device for use in a radio communication system, which performs transmission on a sub-frame basis having a first slot and a second slot temporally continuously arranged. The radio communication device includes a receiving section which receives a signal subjected to pre-coding from a transmitting device as the other communication party, a channel estimation section which performs channel estimation of a transmission path using a reference signal in the received signal, the channel estimation being performed for each of the first slot and the second slot on the assumption that a phase shift amount in a pre-coding weight in the pre-coding differs by $\pi$ between the first slot and the second slot in a sub-frame allocated to the transmitting device, and a demodulation section which demodulates the received signal using a result of the channel estimation corresponding to each of the first slot and the second slot.

Therefore, it is possible to receive a signal subjected to the pre-coding with CDD and PVS applied and to demodulate the received signal on the basis of a result of the channel estimation corresponding to each of the first slot and the second slot. It becomes possible to obtain the space diversity effect and the frequency diversity effect in a plurality of slots. In this case, it is possible to prevent complication of a scheduler or inefficient use of resources, to eliminate the phenomenon in which SINR significantly decreases in a specific slot, and to avoid deterioration of demodulation performance.

According to a ninth aspect of the invention, in the above-described radio communication device, the receiving section may perform communication based on SC-FDMA, the channel estimation section may perform channel estimation according to a phase shift amount corresponding to each SC-FDMA symbol on the assumption that the phase shift amount in the pre-coding weight differs between SC-FDMA symbols, and the demodulation section may demodulate the received signal using a result of the channel estimation corresponding to the SC-FDMA symbol.

Therefore, it is possible to receive a signal subjected to pre-coding with CDD and PVS applied and to demodulate the received signal on the basis of the channel estimation result corresponding to each SC-FDMA symbol. It becomes possible to obtain the space diversity effect and the frequency diversity effect in a plurality of slots.

According to a tenth aspect of the invention, the above-described radio communication device may further include a control signal generation section which generates a control signal including space hopping information for instructing the transmitting device to perform space hopping through pre-coding.

Therefore, it is possible to appropriately set space hopping and to instruct the transmitting device to perform space hopping through pre-coding on the basis of the control signal including the space hopping information.

According to an eleventh aspect of the invention, in the above-described radio communication device, the control signal may be configured such that an instruction bit for frequency hopping and an instruction bit for space hopping are substituted with each other. Therefore, it is possible to instruct frequency hopping and space hopping with a small amount of resources in the control signal.

According to a twelfth aspect of the invention, in the above-described radio communication device, the control signal may include both an instruction bit for frequency hopping and an instruction bit for space hopping, and may use a CRC mask as a CRC mask for space hopping notification when a CRC is applied to the control signal. Therefore, it is possible to independently set frequency hopping and space hopping with a small amount of resources in the control signal to define and instruct a plurality of states.

According to a thirteenth aspect of the invention, in the above-described radio communication device, the channel estimation section may perform channel estimation on the assumption that the amplitude in the pre-coding weight differs between transmitting antennas. Therefore, it becomes possible to randomize interference components to be applied to another radio communication device which is adjacent in the time domain, and to demodulate a signal from each radio communication device.

According to a fourteenth aspect of the invention, in the above-described radio communication device, the channel estimation section may perform the channel estimation on the assumption that the amplitude and delay amount in the pre-coding weight are applied so as to differ between the first slot and the second slot. Therefore, it becomes possible to randomize interference components to be applied to another radio communication device which is adjacent in the time domain, and to demodulate a signal from each radio communication device.

A fifteenth aspect of the invention provides a radio communication base station apparatus including the above-described radio communication device.

A sixteenth aspect of the invention provides a radio communication mobile station apparatus including the above-described radio communication device.

A seventeenth aspect of the invention provides a radio communication method in a radio communication system, which performs transmission on a sub-frame basis having a first slot and a second slot temporally continuously arranged. The radio communication method includes a pre-coding multiplication step of performing pre-coding to form a predetermined beam by multiplying a signal to be output to a plurality of antennas by a pre-coding weight, and a transmitting step of transmitting a transmission signal including the signal subjected to the pre-coding to a receiving device as the other communication party. In the pre-coding multiplication step, a cyclic delay diversity is used to shift a phase in the pre-coding weight such that the phase in the pre-coding weight is cyclically changed on a frequency axis, the phase shift amount is set to change by $2\pi$ in an allocated frequency bandwidth of the local device, and the phase shift amount is set to differ by $\pi$ between the first slot and the second slot in an allocated sub-frame of the local device.

An eighteenth aspect of the invention provides a radio communication method in a radio communication system, which performs transmission on a sub-frame basis having a first slot and a second slot temporally continuously arranged. The radio communication method includes a receiving step of receiving a signal subjected to the pre-coding from a transmitting device as the other communication party, a channel estimation step of performing channel estimation of a transmission path using a reference signal in the received signal, the channel estimation being performed for each of the first slot and the second slot on the assumption that a phase shift amount in a pre-coding weight in the pre-coding differs by $\pi$ between the first slot and the second slot in a sub-frame allocated to the transmitting device, and a demodulation step of demodulating the received signal using a result of the channel estimation corresponding to each of the first slot and the second slot.

Advantageous Effects of Invention

According to the aspects of the invention, it is possible to provide a radio communication device and a radio communication method capable of obtaining the diversity effect in a plurality of slots while preventing complication of a scheduler or inefficient use of resources, eliminating the phenomenon in which SINR significantly decreases in a specific slot, and avoiding deterioration of demodulation performance.

BRIEF DESCRIPTION OF DRAWINGS

FIG. 4 is a diagram showing a phase shift amount and a propagation condition in each slot, and specifically, (A) is a diagram showing a first half slot, and (B) is a diagram showing a second half slot.

FIG. 13 is a diagram showing a second example of the configuration of a control signal for space hopping.

DESCRIPTION OF EMBODIMENTS

In this embodiment, a configuration example of a radio communication device and a radio communication method for use in a cellular system as a radio communication system for mobile communication is provided as an example of a radio communication device and a radio communication method according to the invention. In the following configuration example, in an uplink from a mobile state to a base station, the frame is structured such that one sub-frame as one transmission time unit has two continuous zones (called slots) on the time axis, and MIMO is adopted. This configuration is applied when communication is performed in a frequency domain multiplexing scheme through SC-FDMA. The following embodiments are just an example for illustration, and the invention is not limited to the embodiments.

First Embodiment

In this embodiment, CDD (Cyclic Delay Diversity) which is a kind of delay diversity (DD) is used, and pre-coding transmission is performed using both CDD and PVS, obtaining the space diversity effect and the frequency diversity effect.

The delay diversity means that a transmitting device transmits the same signal from a plurality of antennas, and the delay amount is controlled such that a sufficient time difference (delay) occurs between signals from a plurality of antennas. Thus, even when the interval between a plurality of antennas is small, a sufficient difference (time difference) occurs in radio signals which are transmitted from a plurality of antennas of a transmitting station to the receiving device. For this reason, the receiving device can recognize the difference between the transmission paths of electric waves and separate the signals on the paths, extracting a target signal. Therefore, the diversity effect is obtained.

In the CDD, a delay time (a phase on the frequency axis) is cyclically changed. In this embodiment, in the case of SC-FDMA communication, the phase shift amount to be applied by the CDD is set to change by $2\pi$ in an allocated frequency bandwidth (one resource block) of the local device ($2\pi$/the number of allocated subcarriers) such that the phase is shifted by one sample with respect to the number of DFT points. The phase is shifted by $2\pi/N$ in each output of the N-point DFT outputs, and different cyclic delay amounts are allocated such that the delay amount (or phase) is changed between the DFT outputs. In this embodiment, the time unit (sub-frame) in the resource allocated to the local device is divided into a first half slot and a second half slot, and the phase shift amount to be applied differs by $\pi$ between the first half slot (first slot) and the second half slot (second slot).

Figure 1:
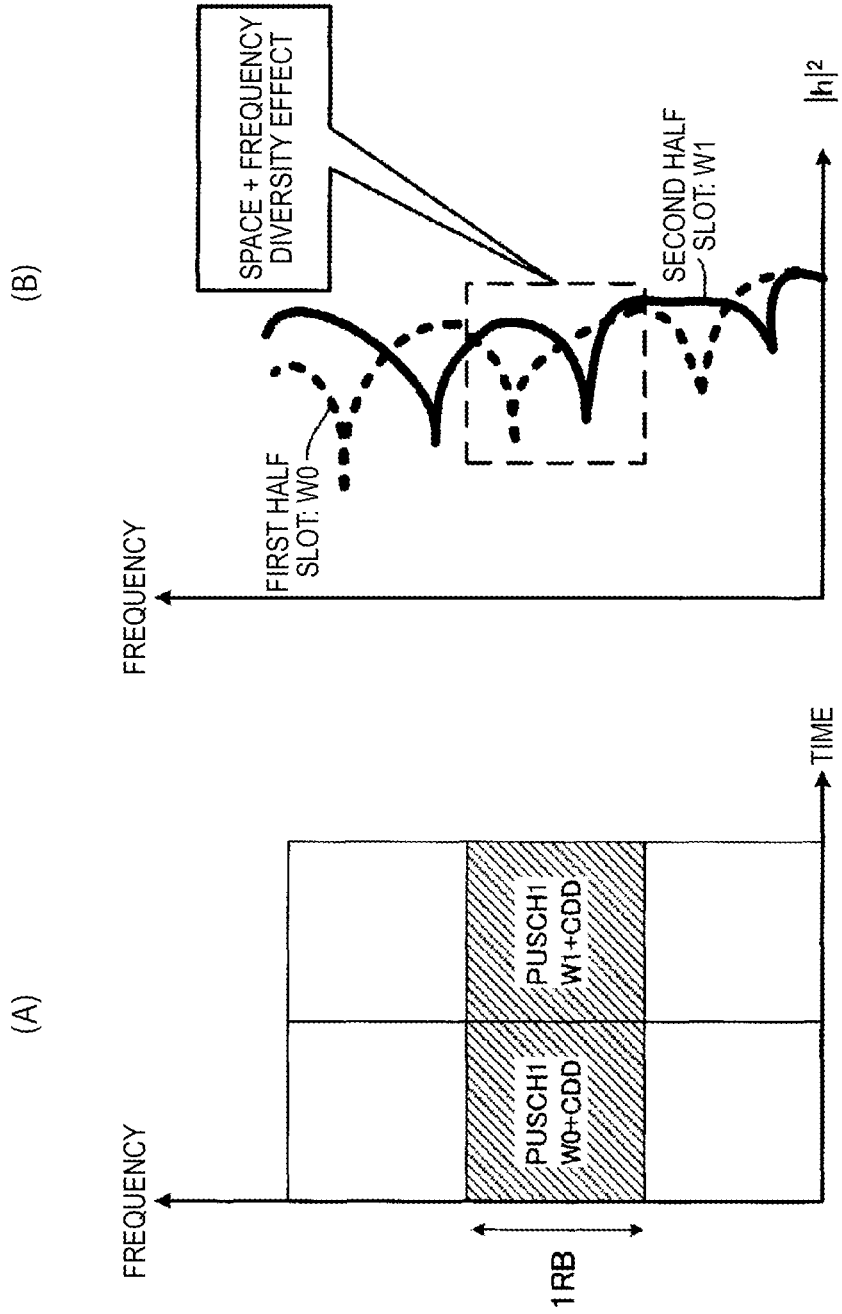
FIG. 1 is a diagram showing an operation example of space hopping with CDD and PVS applied according to a first embodiment of the invention, and specifically, (A) is a diagram showing allocation of frequency resources and allocation of a pre-coding weight for each slot in each frequency resource, and (B) is a diagram showing a channel gain at that time.

FIG. 1 is a diagram showing an operation example of space hopping with CDD and PVS applied according to the first embodiment of the invention. In FIG. 1, (A) shows the allocation of frequency resources and allocation of a pre-coding weight for each slot in each frequency resource, and (B) shows a channel gain $|h|^2$ at that time. In the first embodiment, the same resource block is used without changing the frequency resource allocated to each user. In the example of FIG. 1(A), pre-coding weights, such as W0 and W1, which differ between the slots, are applied to a first user terminal PUSCH1, and a cyclic phase shift amount by the CDD is applied in each slot. At this time, a user terminal of a mobile station which is a transmitting device allocated with a resource for space hopping transmits data through CDD pre-coding transmission such that the phase shift amount differs by $\pi$ between the first half slot and the second half slot in the sub-frame in the resource block allocated to the local device. The user terminal performs the same CDD pre-coding control as a data part on a demodulation reference signal RS (DM-RS: Demodulation Reference Signal) of each slot and transmits the modulation reference signal RS. The base station which is the receiving device demodulates the signal from the user terminal in a slot unit for a sub-frame self-allocated to each user terminal.

With the above operation, the characteristic shown in FIG. 1(B) is obtained as a channel gain. In this case, the SINR is periodically changed in an allocated resource block of the local device by the CDD, and a peak and a notch occur. The position of the notch in the signal transmitted through CDD pre-coding transmission differs by a substantially half period between the first half slot and the second half slot. Thus, it is possible to obtain both the space diversity effect and the frequency diversity effect in the sub-frame. The use of both the PVS and the CDD allows adjustment of the channel gain in the frequency direction. For this reason, frequency hopping is not needed, the complexity of a scheduler for searching for a pair of user terminals, which performs frequency hopping, is not needed, and an empty frequency resource does not occur. It is also possible to reduce the dispersion of a channel gain between slots, making it possible to avoid deterioration of demodulation performance, such as Turbo decoding.

Next, description will be provided as to the configuration of a specific example of the transmitting device and the receiving device in the radio communication system of the first embodiment.

Figure 2:
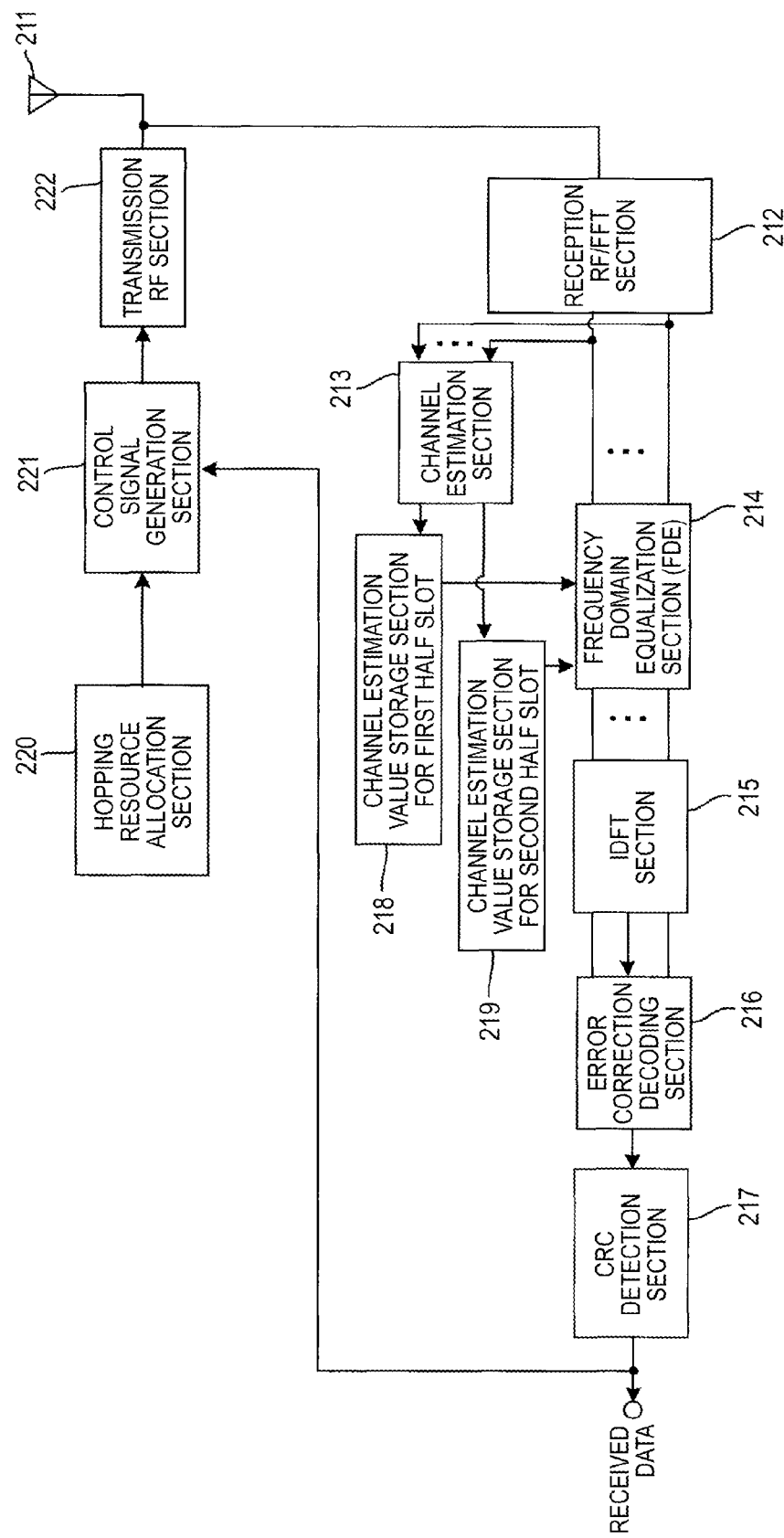
FIG. 2 is a block diagram showing the configuration of a main part of a receiving device for use in the first embodiment of the invention.
Figure 3:
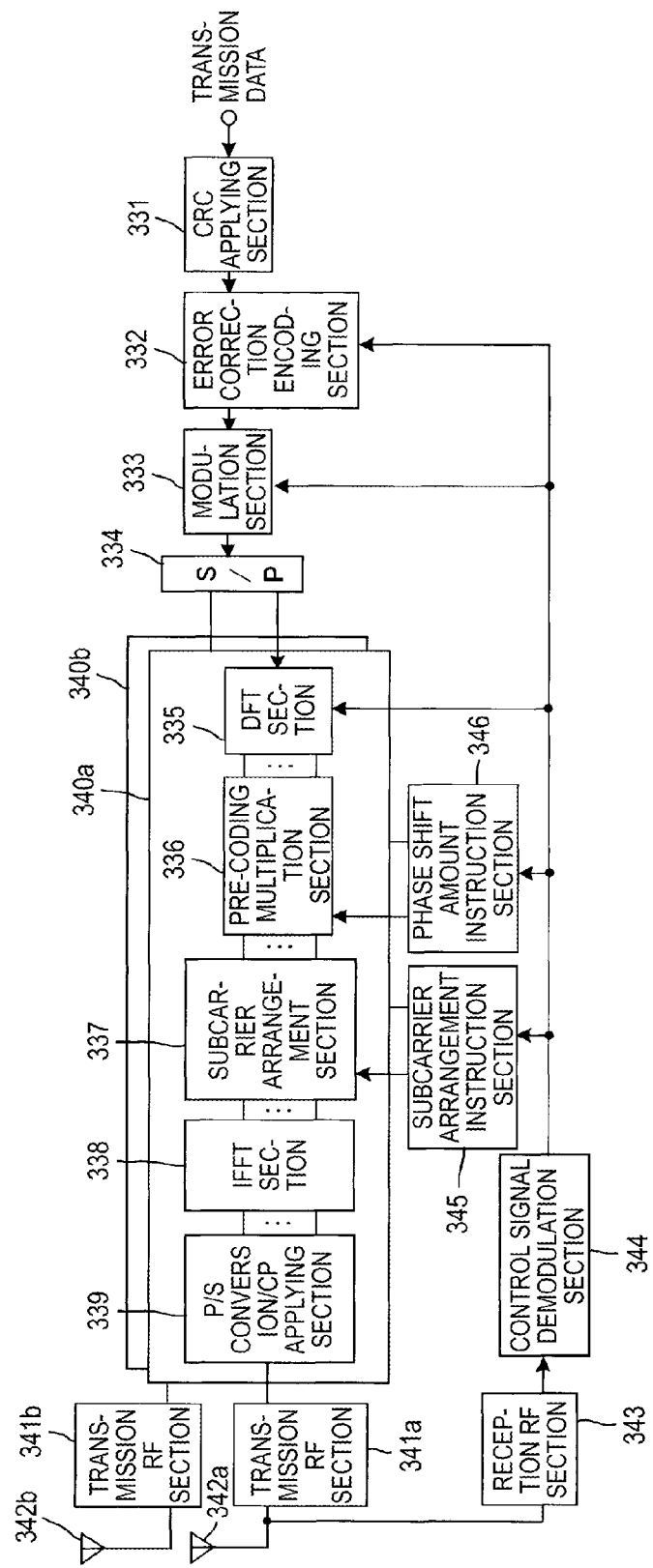
FIG. 3 is a block diagram showing the configuration of a main part of a transmitting device for use in the first embodiment of the invention.

FIG. 2 is a block diagram showing the configuration of a main part of a receiving device for use in the first embodiment of the invention. FIG. 3 is a block diagram showing the configuration of a main part of a transmitting device for use in the first embodiment of the invention.

In this embodiment, it is assumed that radio communication is performed between the receiving device shown in FIG.

2 and the transmitting device shown in FIG. 3 using electric waves. Here, it is assumed that the receiving device shown in FIG. 2 is applied to a radio communication base station apparatus (radio base station, BS) of a cellular system, and the receiving device shown in FIG. 3 is applied to a user terminal (UE) which is a radio communication mobile station apparatus, such as a mobile phone. Here, it is also supposed that pre-coding transmission is performed using a plurality of antennas on the transmission side. As the form of a communication signal, it is assumed that communication is performed in a frequency domain multiplexing scheme through SC-FDMA, and a plurality of symbols are transmitted for each slot of two slots constituting one sub-frame.

The receiving device shown in FIG. 2 includes an antenna 211, a reception RF/FFT section 212, a channel estimation section 213, a frequency domain equalization section (FDE) 214, an IDFT section 215, an error correction decoding section 216, a CRC detection section 217, a channel estimation value storage section 218 for a first half slot, a channel estimation value storage section 219 for a second half slot, a hopping resource allocation section 220, a control signal generation section 221, and a transmission RF section 222.

The transmitting device shown in FIG. 3 includes a CRC applying section 331, an error correction encoding section 332, a modulation section 333, an S/P conversion section 334, a plurality of transmission signal generation sections 340a and 340b, a plurality of transmission RF sections 341a and 341b, a plurality of antennas 342a and 342b, a reception RF section 343, a control signal demodulation section 344, a subcarrier arrangement instruction section 345, and a phase shift amount instruction section 346. Each of the transmission signal generation sections 340a and 340b includes a DFT section 335, a pre-coding multiplication section 336, a subcarrier arrangement section 337, an IFFT section 338, and a P/S conversion/CP applying section 339.

In the receiving device (base station), the hopping resource allocation section 220 allocates resources for space hopping toward the transmitting device (user terminal) in which hopping allocation is needed. Here, an example where hopping allocation is needed includes a case where the base station may not ascertain the status of the transmission path from the user terminal toward the base station in an initial step of connection or the like, specifically, where Sounding RS which is a channel for upstream link quality measurement is not received. Hopping allocation is also performed when there is no empty resource block in an appropriate propagation condition. The control signal generation section 221 generates a control signal including an allocation notification of a resource for space hopping. The transmission RF section 222 converts the control signal to a high-frequency signal in a predetermined radio frequency band, performs power amplification, and transmits the high-frequency signal as an electric wave from the antenna 211 to the user terminal which is the other communication station.

Meanwhile, in the transmitting device (user terminal), the antenna 342b receives the high-frequency signal as an electric wave including the control signal, and the reception RF section 343 converts the high-frequency signal to a signal in a comparatively low frequency band, such as a baseband signal. The control signal demodulation section 344 demodulates the control signal from the received signal and acquires control information including the allocation notification of the resource for space hopping, subcarrier arrangement information, and the like. The transmission signal generation sections 340a and 340b generate, on the basis of the allocation notification of the resource for space hopping, transmission signals using local data signals for the relevant resource.

Here, as processing in a previous step, the CRC applying section 331 adds CRC to transmission data, and the error correction encoding section 332 performs error correction encoding. Subsequently, the modulation section 333 performs primary modulation processing, such as QPSK, and then the S/P conversion section 334 converts a serial signal to a parallel signal. In the transmission signal generation sections 340a and 340b, the DFT section 335 transforms a modulated signal in a time domain to a frequency domain through a discrete Fourier transform (DFT), and the pre-coding multiplication section 336 performs multiplication of a pre-coding weight on the basis of an instruction from the phase shift amount instruction section 346 to perform pre-coding processing. Thereafter, the subcarrier arrangement section 337 arranges data symbols corresponding to each subcarrier in the SC-FDMA on the basis of an instruction from the subcarrier arrangement instruction section 345.

The IFFT section 338 transforms transmission symbols to time domain signals through an inverse fast Fourier transform for each transmission symbol. Then, the P/S conversion/CP applying section 339 converts a parallel signal to a serial signal and adds CP (Cyclic Prefix) to the serial signal. Thereafter, the transmission RF sections 341a and 341b convert the transmission signals, which are the baseband signals, to high-frequency signals, perform power amplification, and transmit the high-frequency signals as electric waves from the antennas 342a and 342b toward the base station which is the other communication station.

In generating the transmission signal, the pre-coding multiplication section 336 performs multiplication of a pre-coding weight which applies a cyclic phase shift amount by the CDD. At this time, the phase shift amount differs by $\pi$ between the first half slot and the second half slot in accordance with the allocation notification of the resource for space hopping. The details of the signal generating method will be described below.

Meanwhile, in the receiving device (base station), the antenna 211 receives the high-frequency signal as an electric wave including the transmission signal from the transmitting device, and the reception RF/FFT section 212 transforms the high-frequency signal to a signal in a comparatively low frequency band, such as a baseband signal and then transforms the received signal to a signal in a high frequency band through a fast Fourier transform (FFT). Then, the signal of the resource for space hopping allocated to the user terminal is detected from the received signal, and reception processing is performed assuming a predefined space hopping transmitting method. Specifically, the DM-RS in each of the first half slot and the second half slot is extracted from the received signal, and the channel estimation section 213 performs a correlation arithmetic operation between the DM-RS of each slot and a reference signal for reference prepared in advance on the reception side to acquire a channel estimation value. The channel estimation value for the first half slot is stored and retained in the channel estimation value storage section 218 for a first half slot, and the channel estimation value for a second half slot is stored and retained in the channel estimation value storage section 219 for a second half slot.

Then, the frequency domain equalization section 214 is input with the data symbol of the received signal, and performs frequency domain equalization processing for a frequency response obtained from the channel estimation value in each of the first half slot and the second half slot. Thereafter, the IDFT section 215 transforms the received signal to the time domain signal through an inverse discrete Fourier transform (IDFT), the error correction decoding section 216 performs error correction decoding processing for obtained received data, and the CRC detection section 217 performs CRC examination. Here, if the CRC detection result is OK, a sequence of received data is output, and the control signal generation section 221 generates a response signal of Ack (Acknowledgment) indicating that the relevant signal could be demodulated without trouble and returns the response signal to the relevant user terminal. If the CRC detection result is NG, Nack (Negative Acknowledgment) indicating that the relevant signal could not be demodulated is returned to the relevant user terminal.

In the above configuration, the antenna 211 and the reception RF/FFT section 212 of the receiving device realize a function of a receiving section. The transmission RF sections 341a and 341b and the antennas 342a and 342b of the transmitting device realizes a function of a transmitting section.

Although an example has been described where the configuration of the transmitting device and the receiving device performs SC-FDMA communication, even when OFDM communication is performed, the same can be applied. In a radio communication device which performs OFDM communication, the IDFT section 215 in the receiving device of FIG. 2 becomes a P/S conversion section, and the DFT section 335 in the transmitting device of FIG. 3 is not provided.

Subsequently, the details of the signal generating method in the resource for space hopping will be described. The transmitting device realizes space hopping by carrying out the following operations on the basis of respective control information instructed by the control signal demodulation section 344. The phase shift amount instruction section 346 notifies the phase shift amount to be applied by the CDD to the pre-coding multiplication section 336 of each of the transmission signal generation sections 340a and 340b corresponding to the respective transmitting antennas. Here, as the phase shift amount, a phase rotation amount expressed by the following expression (1) is applied to a k-th component of the N-point DFT outputs (where k=0 to N−1).

[Expression 1]

$$W_m = \begin{bmatrix} 1 & e^{j2\pi(\frac{1}{N}k+\frac{1}{2}m)} \end{bmatrix}^T \quad (1)$$

In the expression (1), m is a value to be applied in accordance with a slot number, and 0 is set in the first half slot of the sub-frame and 1 is set in the second half slot of the sub-frame. The phase shift amount instruction section 346 instructs the antenna number of the transmitting antenna, the slot number m, and the DFT output number k, such that in the pre-coding multiplication section 336, pre-coding processing is realized in which a predetermined phase shift amount with CDD and PVS applied is applied.

FIG. 4 is a diagram showing a phase shift amount and a propagation condition in each slot. In FIG. 4, (A) shows the first half slot and (B) shows the second half slot. In the first half slot, the phase shift amount on the upper side of FIG. 4(A) is applied by a pre-coding weight W0, such that the propagation condition on the lower side is obtained. Here, the amplitude of the transmission path is shown. In the second half slot, the phase shift amount on the upper side of FIG. 4(B) is applied by a pre-coding weight W1, such that the propagation condition on the lower side is obtained.

With the use of the pre-coding weights W0 and W1, it is possible to realize the channel gain and the propagation condition shown in FIG. 1(B). Specifically, in the frequency domain (allocated domain) of one resource block surrounded by a broken line, one notch and fading mountain can be formed, and the propagation condition can be observed in which the first half slot and the second half slot are deviated by half of the allocated band. In other words, the position at which energy of the space axis is arranged in the frequency direction is appropriately adjusted, effectively obtaining the space diversity effect and the frequency diversity effect.

Figure 5:
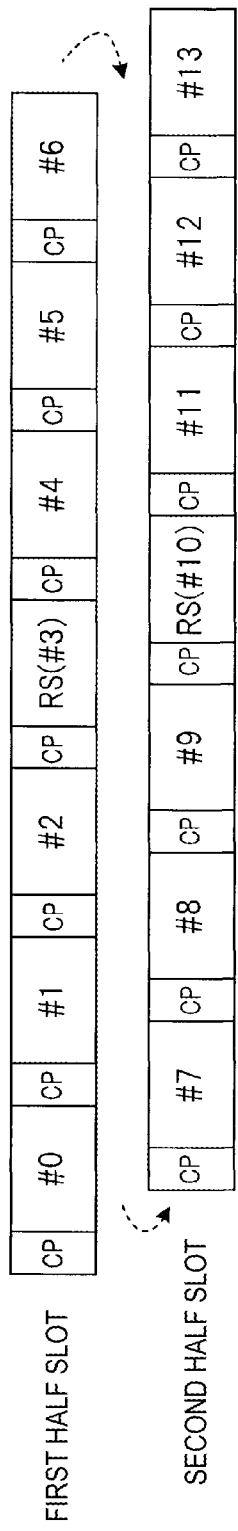
FIG. 5 is a diagram showing the configuration of a sub-frame of a communication signal in this embodiment.
Figure 6:
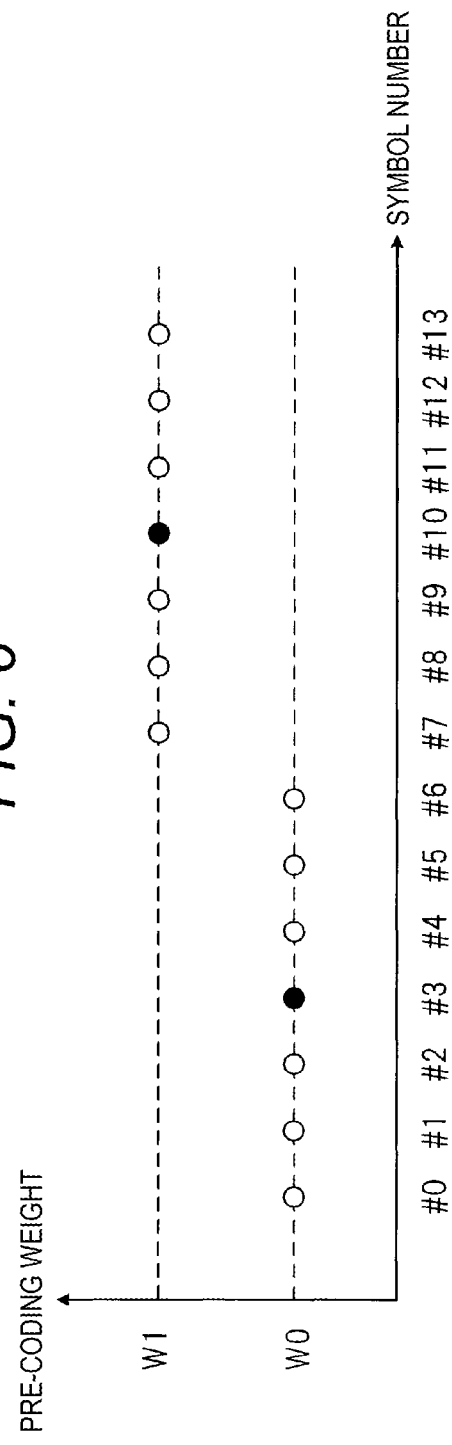
FIG. 6 is a diagram showing a setting example of a pre-coding weight in the first embodiment.

The correspondence between the configuration of each slot in the sub-frame and the pre-coding weights W0 and W1 will be described. FIG. 5 is a diagram showing the configuration of a sub-frame of a communication signal in this embodiment. FIG. 6 is a diagram showing a setting example of a pre-coding weight in the first embodiment.

FIG. 5 shows an example of a frame format in an uplink based on the next-generation mobile communication standard which has been adopted in the 3GPP Long Term Evolution (hereinafter, called LTE). One sub-frame has two slots of a first half slot and a second half slot, and each slot has seven symbols. A CP is inserted between the symbols. The first half slot is #0 to #6, the second half slot is #7 to #13, and a DM-RS which becomes a pilot signal is arranged at the central part (#3, #10) of each slot.

In the first embodiment, in the frame format of FIG. 5, as shown in FIG. 6, multiplication is done in a slot unit using different pre-coding weights W0 and W1 in the first half slot and the second half slot, such that pre-coding with CDD and PVS applied is performed. Thus, it is possible to realize an operation to switch the propagation condition shown in FIG. 1(B) for a time (for example, 0.5 ms) comparatively longer than the slot unit.

Figure 7:
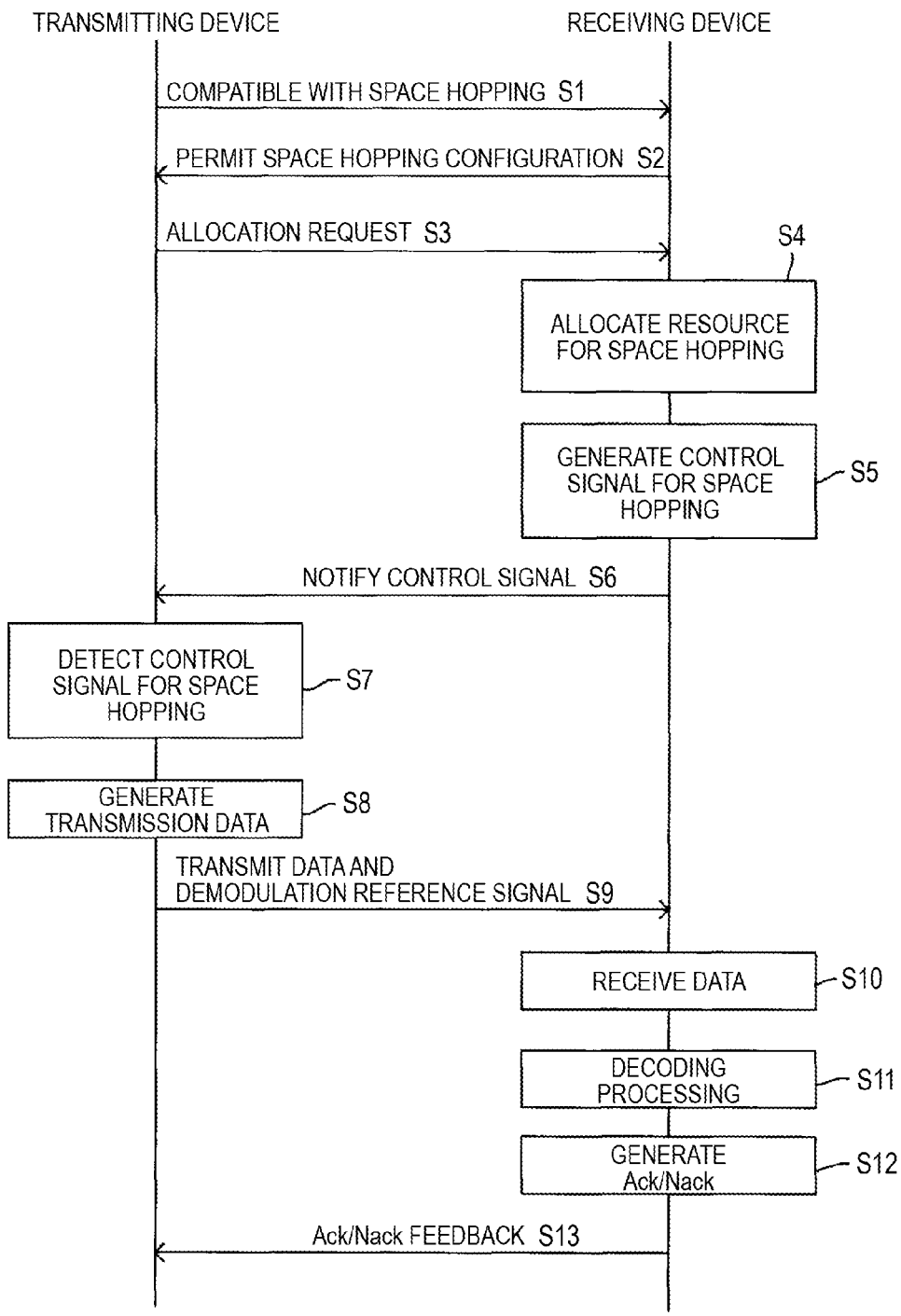
FIG. 7 is a sequence diagram showing a specific example of the procedure of overall processing concerning communication between a transmitting device and a receiving device in this embodiment.

Next, in this embodiment, a processing procedure when communication is performed between the receiving device shown in FIG. 2 and the transmitting device shown in FIG. 3 will be described with reference to FIG. 7. FIG. 7 is a sequence diagram showing a specific example of the procedure of overall processing concerning communication between a transmitting device and a receiving device in this embodiment.

The transmitting device (user terminal) notifies the transmitting device of space hopping compatible information indicating that it is compatible with space hopping through pre-coding with CDD and PVS applied of this embodiment (Step S1). When receiving the space hopping information, the receiving device (base station) returns a space hopping permission signal to permit a space hopping configuration to the transmitting device (Step S2). On the other hand, the transmitting device transmits an allocation request of a resource for use in the local device to the transmitting device (Step S3).

Next, in the receiving device, the hopping resource allocation section 220 allocates resources for space hopping to the transmitting device which has issued the allocation request (Step S4). Subsequently, in the receiving device, the control signal generation section 221 generates a control signal for space hopping including a resource allocation notification (Step S5). Then, the receiving device transmits and notifies the generated control signal for space hopping to the transmitting device through the transmission RF section 222 and the antenna 211 (Step S6).

The transmitting device receives the signal through the antenna 342a and the reception RF section 343, and the control signal demodulation section 344 demodulates the control signal to detect the control signal for space hopping notified from the receiving device (Step S7). Then, in the transmitting device, with the use of the above-described signal generating method, the transmission signal generation sections 340a and 340b generate transmission signals on the basis of transmission data such that a signal with space hopping applied is transmitted to an allocated resource (Step S8).

Subsequently, the transmitting device transmits a transmission signal including generated transmission data to the receiving device through the transmission RF sections 341a and 341b and the antennas 342a and 342b together with the DM-RS (Step S9).

The receiving device receives the signal through the antenna 211 and the reception RF/FFT section 212. The channel estimation section 213 performs channel estimation of the first half slot and the second half slot using the DM-RS through signal processing corresponding to the transmission signal. The frequency domain equalization section 214 performs frequency domain equalization processing or the like on the basis of the channel estimation result to demodulate the received signal. In this way, data reception is performed. Simultaneously, the error correction decoding section 216 performs decoding processing on the basis of the control information which has been notified by the local device (Steps S10 and S11). Thereafter, in the receiving device, the CRC detection section 217 performs CRC examination. The control signal generation section 221 generates a response signal indicating Ack if the CRC detection result is OK and a response signal indicating Nack if the CRC detection result is NG (Step S12). Then, the receiving device transmits the generated response signal of Ack or Nack through the transmission RF section 222 and the antenna 211 and gives feedback to the transmitting device (Step S13).

In the above-described first embodiment, pre-coding with CDD and PVS applied is performed by shifting the phase such that the phase is changed by $2\pi$ in one resource block by the CDD and by multiplication using the pre-coding weights W0 and W1 which differ by $\pi$ between the first half slot and the second half slot in the sub-frame. Thus, it is possible to perform hopping control by beam switching while applying an artificial frequency fluctuation in a state where the user terminal is allocated to the same resource block, and to switch the propagation condition in a slot unit, obtaining the space diversity effect and the frequency diversity effect. In this case, it is possible to prevent complication of a scheduler or inefficient use of resources, to eliminate the phenomenon in which the SINR significantly decreases in a specific slot, and to avoid deterioration of demodulation performance. For this reason, it becomes possible to realize the introduction of space hopping into the uplink of the cellular system with good characteristics.

Second Embodiment

A second embodiment is an example where a part of the operation of the first embodiment is changed, and the method of pre-coding with CDD and PVS applied is changed. A user terminal of a mobile station which is a transmitting device allocated with a resource for space hopping transmits data through CDD pre-coding transmission with different phase shift amounts between data symbols (SC-FDMA symbols) in the sub-frame of the resource block allocated to the local device. The user terminal transmits a demodulation reference signal RS (DM-RS) of each slot through CDD pre-coding transmission with phase shift amounts differing by $\pi$. The phase shift amount in each data symbol is applied so as to be demodulated using two DM-RS in the first half slot and the second half slot. For example, the phase shift amount is set to differ by $\pi$ between the odd-numbered symbol and the even-numbered symbol. Alternatively, a phase shift rotation amount may be used which is obtained by linearly interpolating two DM-RS of the first half slot and the second half slot such that the phase shift amount is changed between symbols in a stepwise manner. The base station which is a receiving device demodulates a signal from the user terminal in a slot unit for a sub-frame self-allocated to each user terminal.

With the above-described operation, the position of a notch in a signal transmitted through CDD pre-coding transmission is changed between data symbols, making it possible to obtain both the space diversity effect and the frequency diversity effect.

In the second embodiment, when pre-coding with CDD and PVS applied is performed, with regard to the definition of the phase shift amount, the value of a pre-coding weight applied to the slot number is flexibly set. Hereinafter, description will be provided focusing on the differences from the first embodiment. The configuration of the transmitting device is the same as in the first embodiment of FIG. 3.

First, as a first operation example, an example will be described where the way to apply a phase shift amount expressed by the above-described expression (1) is changed. In the first operation example, m in the expression (1) is changed for each data symbol in the sub-frame with m=0 for an odd-numbered symbol and m=1 for an even-numbered symbol. Then, the DM-RS is transmitted with m=0 for the first half slot and m=1 for the second half slot. The phase shift amount instruction section 346 assigns the phase shift amount which differs by $\pi$ between the symbols described above, and the pre-coding multiplication section 336 performs multiplication of the pre-coding weight.

Figure 8:
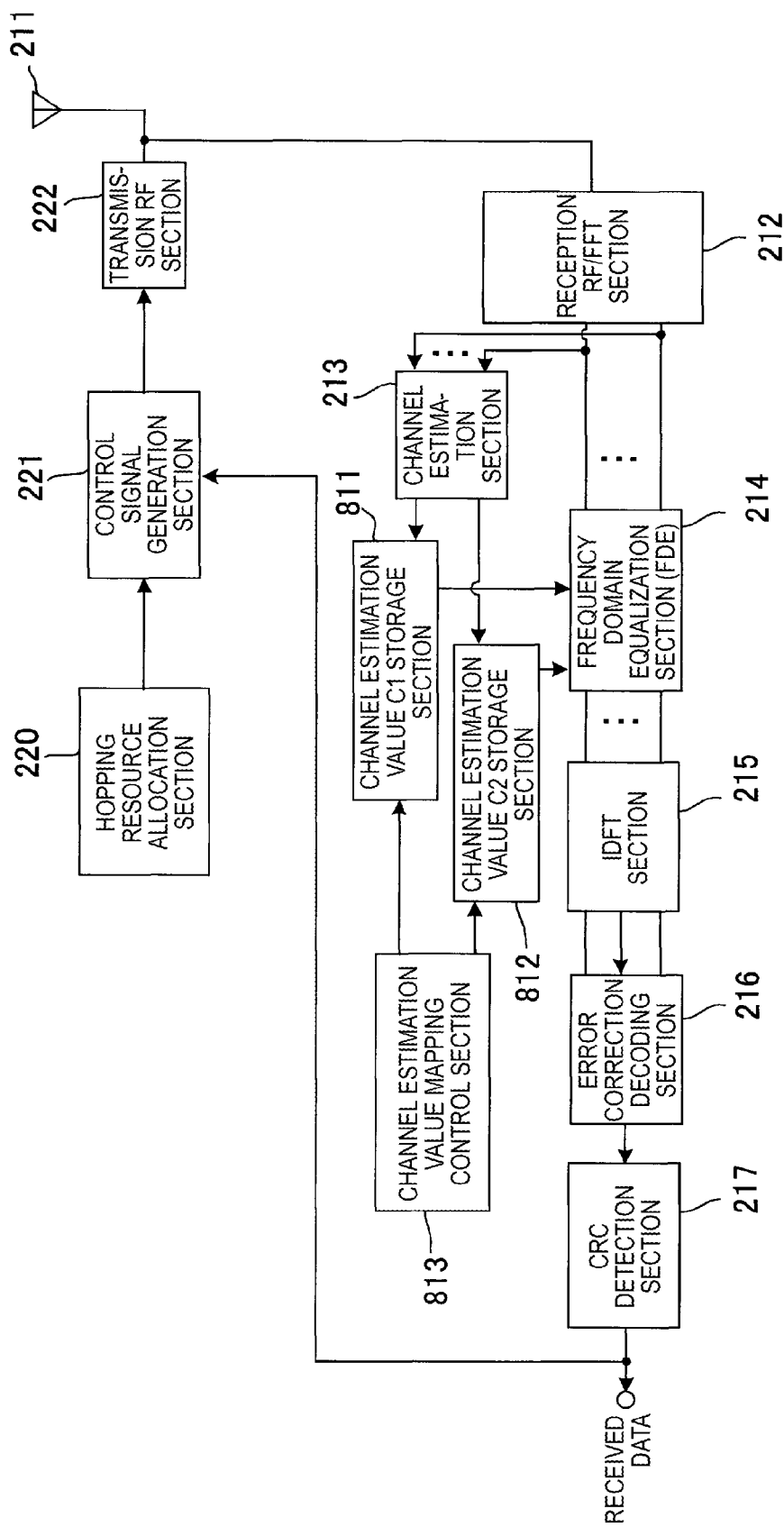
FIG. 8 is a block diagram showing the configuration of a main part of a receiving device for use in a second embodiment of the invention.

FIG. 8 is a block diagram showing the configuration of a main part of a receiving device for use in the second embodiment of the invention. The receiving device of the second embodiment includes a channel estimation value C1 storage section 811 and a channel estimation value C2 storage section 812, instead of the channel estimation value storage section 218 for a first half slot and the channel estimation value storage section 219 for a second half slot of the first embodiment shown in FIG. 2. A channel estimation value mapping control section 813 is also provided. Other constituent elements are the same as those in the first embodiment shown in FIG. 2.

The channel estimation value C1 storage section 811 and the channel estimation value C2 storage section 812 respectively store estimation values calculated by using the DM-RS of the first half slot and the DM-RS of the second half slot. That is, the channel estimation value C1 storage section 811 stores a channel estimation value C1 using the DM-RS of the first half slot, and the channel estimation value C2 storage section 812 stores a channel estimation value C2 using the DM-RS of the second half slot. The channel estimation value mapping control section 813 instructs the channel estimation value C1 storage section 811 and the channel estimation value C2 storage section 812 to output the channel estimation values. Here, in demodulating an odd-numbered symbol, the channel estimation value C1 is output from the channel estimation value C1 storage section 811 to the frequency domain equalization section 214. In demodulating an even-numbered symbol, the channel estimation value C2 is output from the channel estimation value C2 storage section 812 to the frequency domain equalization section 214.

Figure 9:
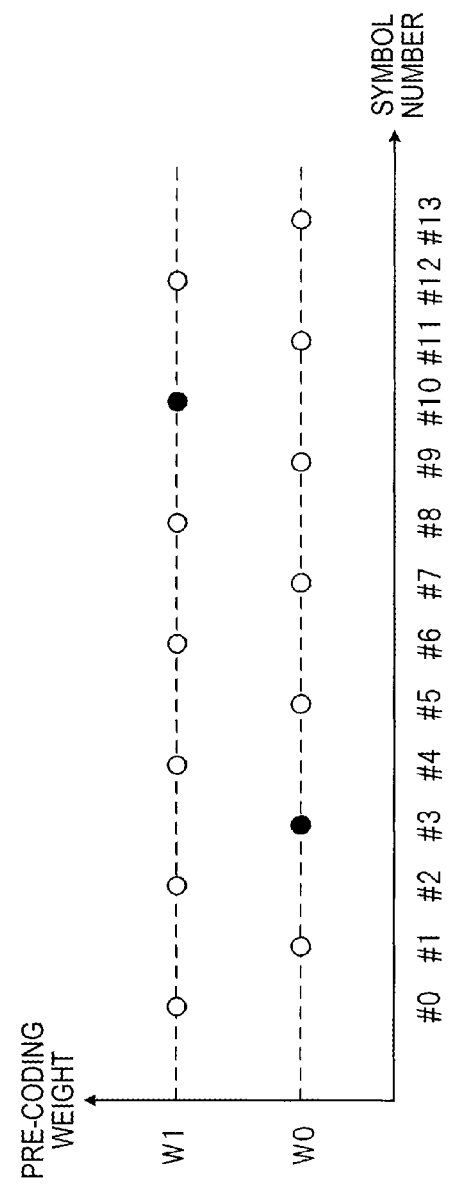
FIG. 9 is a diagram showing a setting example of a pre-coding weight in a first operation example of the second embodiment.

FIG. 9 is a diagram showing a setting example of a pre-coding weight in the first operation example of the second embodiment. In the first operation example, in the frame format shown in FIG. 5, as shown in FIG. 9, pre-coding with CDD and PVS applied is performed by multiplication using the pre-coding weights W0 and W1 which differ between an odd-numbered symbol and an even-numbered symbol in the symbol unit. Thus, it is possible to realize the operation to switch the propagation condition shown in FIG. 1(B) for a time (for example, 0.071 ms) comparatively shorter than the symbol unit, obtaining a stronger diversity effect.

Next, as a second operation example, an application example will be described where the expression of the phase shift amount to be applied is changed. In the second operation example, as the phase shift amount to be applied by the CDD, a phase rotation amount expressed by the following expression (2) is applied to a k-th component of the N-point DFT outputs (where k=0 to N−1).

[Expression 2]

$$W_m = \begin{bmatrix} 1 & e^{j2\pi(\frac{1}{N}k+\frac{1}{M}m)} \end{bmatrix}^T \quad (2)$$

In the expression (2), m is a value to be applied in accordance with a slot number, and 0 is set in the first half slot of the sub-frame and 1 is set in the second half slot of the sub-frame. M is a value to be applied in accordance with a symbol number in the sub-frame. In the frame format of the uplink which is studied in the LTE, M=1 to 14 in one sub-frame.

Figure 10:
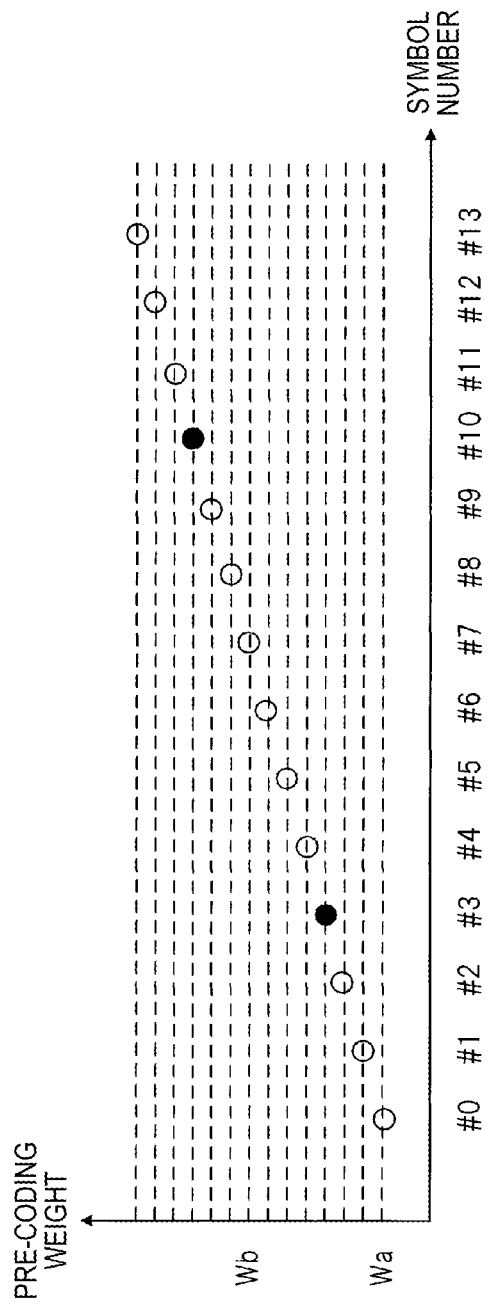
FIG. 10 is a diagram showing a setting example of a pre-coding weight in a second operation example of the second embodiment.

FIG. 10 is a diagram showing a setting example of a pre-coding weight in a second operation example of the second embodiment. In the second operation example, in the frame format shown in FIG. 5, as shown in FIG. 10, the DM-RS is arranged at the fourth and eleventh places (#3, #10), and a pre-coding weight is set by the expression (2) such that the phase shift amount which is linearly interpolated in the symbol unit is applied.

Figure 11:
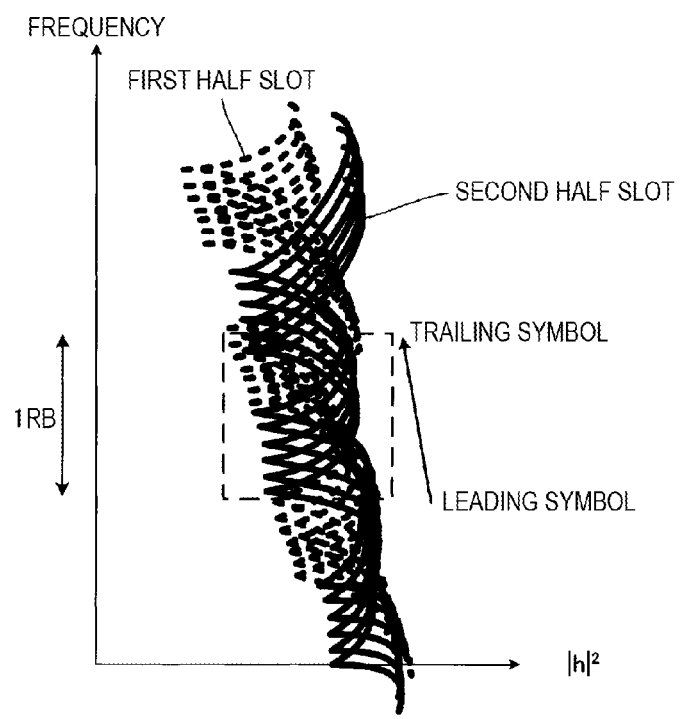
FIG. 11 is a diagram showing an operation example of space hopping with CDD and PVS applied in the second operation example of the second embodiment.

FIG. 11 is a diagram showing an operation example of space hopping with CDD and PVS applied in the second operation example of the second embodiment. FIG. 11 shows the propagation condition depending on the channel gain $|h|^2$. In this case, the channel estimation values in two DM-RS arranged at the fourth and eleventh places in the sub-frame are linearly interpolated in the symbol unit, and as shown in FIG. 11, an operation is made to switch the propagation condition in each slot in a stepwise manner between symbols. Thus, a stronger diversity effect is obtained.

In the above-described second embodiment, in performing pre-coding with CDD and PVS applied, multiplication is done by using different pre-coding weights between data symbols of SC-FDMA. When this happens, it is possible to switch the propagation condition for a short time of the symbol unit in a state where the user terminal is allocated to the same resource block, obtaining the space diversity effect and the frequency diversity effect.

Third Embodiment

A third embodiment is an example concerning the method of generating a control signal for space hopping in the first embodiment and the second embodiment. In this embodiment, with the operation procedure shown in the sequence diagram of FIG. 7, the transmitting device notifies the receiving device in advance that the local device has ability compatible with space hopping through transmission of space hopping compatible information, or the like. Then, the receiving device responds to the notification through transmission to the transmitting device of a space hopping permission signal indicating that a space hopping configuration is permitted, or the like.

Then, when the base station which is the receiving device receives the allocation request from the user terminal which is the transmitting device and performs resource allocation to the transmitting device, the receiving device allocates resources for space hopping to the user terminal, which requires hopping, on the basis of the notification contents and generates and notifies a control signal for space hopping. As the control signal for space hopping, an instruction bit for frequency hopping may be substituted by an instruction bit for space hopping, or an instruction bit for frequency hopping and an instruction bit for space hopping may be provided and a control signal including the instruction bits may be generated.

Figure 12:
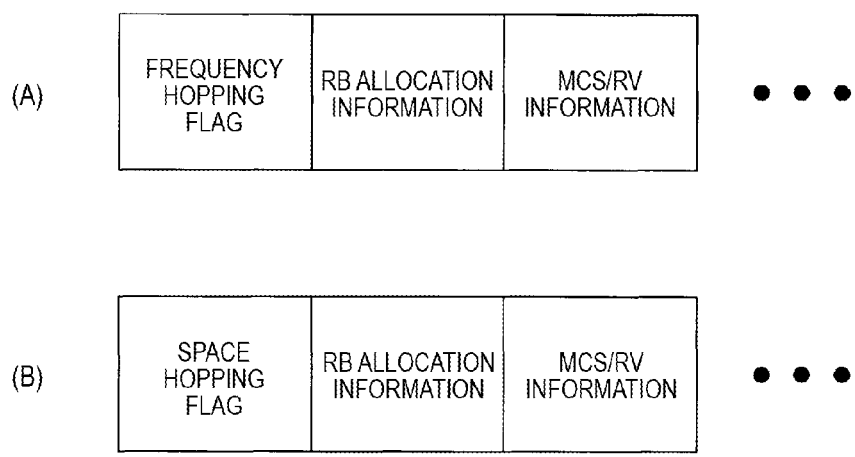
FIG. 12 is a diagram showing a first example of the configuration of a control signal for space hopping, and specifically, (A) is a diagram showing a control signal of the related art method, and (B) is a diagram showing a control signal of this embodiment.

FIG. 12 is a diagram showing a first example of the configuration of a control signal for space hopping. In FIG. 12, (A) shows a control signal of the related art method, and (B) shows a control signal of this embodiment. The first example is configured such that an instruction bit for frequency hopping is substituted by an instruction bit for space hopping. The control signal of the related art method shown in FIG. 12(A) sequentially includes a frequency hopping flag, RB allocation information, MCS (Modulation and Coding Scheme)/RV (Redundancy Version) information, and the like. The control signal of the first example of this embodiment shown in FIG. 12(B) includes a space hopping flag, RB allocation information, MCS/RV information, and the like.

Figure 17:
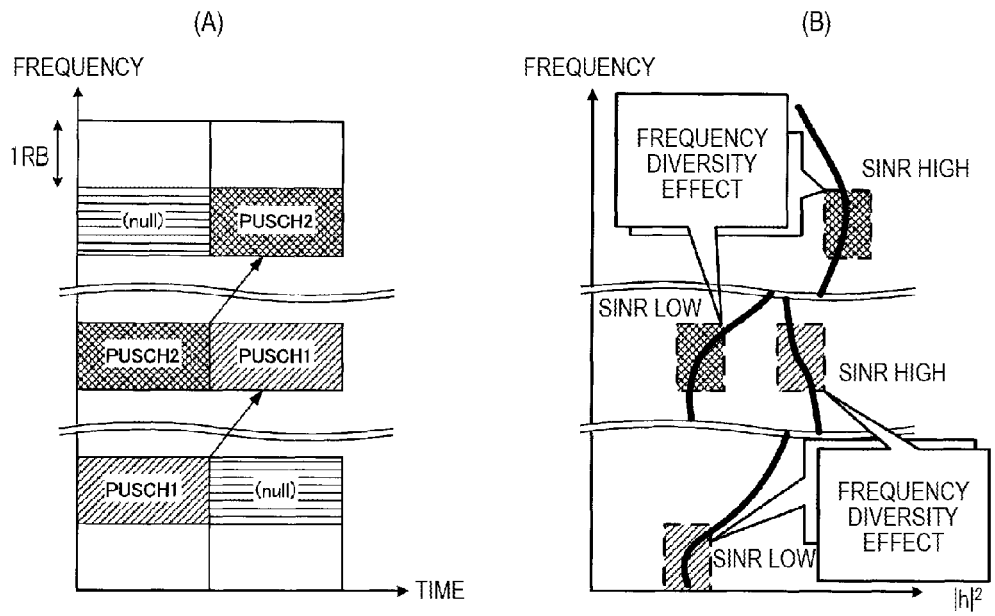
FIG. 17 is a diagram showing an operation example of frequency hopping in an uplink, and specifically, (A) is a diagram showing allocation of frequency resources, and (B) is a diagram showing a channel gain at that time.
Figure 18:
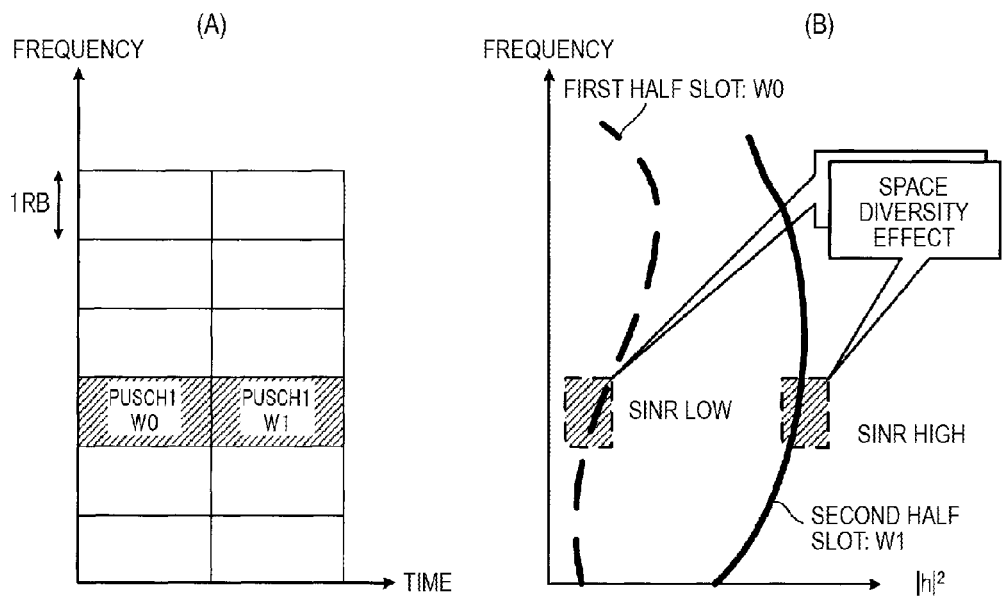
FIG. 18 is a diagram showing an operation example of space hopping with PVS applied in an uplink, and specifically, (A) is a diagram showing allocation of frequency resources and allocation of a pre-coding weight in each frequency resource, and (B) is a diagram showing a channel gain at that time.

In this case, when the space hopping configuration is permitted from the receiving device, the transmitting device detects the control signal assuming the format of (B). Otherwise, the transmitting device detects the control signal assuming the format of (A). Specifically, with regard to the contents indicated by a hopping flag, when a space hopping configuration is permitted, RB allocation information is analyzed that the same allocation is done to both slots in the sub-frame, like the allocation example shown in FIG. 1(A), and data is transmitted through space hopping with CDD and PVS applied of this embodiment. Meanwhile, when the space hopping configuration is not permitted, RB allocation information is analyzed that allocation differs between the first half slot and the second half slot, like the allocation example shown in FIG. 17(A), and data is transmitted through frequency hopping.

FIG. 13 is a diagram showing a second example of the configuration of a control signal for space hopping. The second example is configured such that both an instruction bit for frequency hopping and an instruction bit for space hopping are provided. In this case, in applying CRC to a control signal, a CRC mask is utilized as a CRC mask for space hopping notification. The CRC mask is used for antenna selection in the uplink, or the like. Specifically, when the space hopping configuration is not permitted (when space hopping is OFF), the last bit of the CRC mask for space hopping notification is set to 0, and when the space hopping configuration is permitted (when space hopping is ON), the last bit of the CRC mask for space hopping notification is set to 1. Thus, even when a space hopping flag is not specifically provided in the control signal, it is possible to give notification of the ON/OFF state of space hopping by using the CRC mask. It is also possible to give notification of the availability of both frequency hopping and space hopping without increasing the amount of data of the control signal.

When the instruction bit for frequency hopping and the instruction bit for space hopping are provided in the control signal, at the time of a resource allocation notification by the control signal from the receiving device to the transmitting device, four statuses may be defined by combinations of both the instruction bits and appropriately executed. In this case, the receiving device can independently set the ON/OFF state of space hopping and frequency hopping and perform resource allocation. In the transmitting device, a transmission signal is generated such that a hopping operation is carried out in correspondence with a state of being defined by a combination of the instruction bits of frequency hopping and space hopping on the basis of the control signal notified from the receiving device.

According to the third embodiment, information indicating availability of space hopping with CDD and PVS applied can be included in the control signal and notified to the transmitting device. At this time, the instruction bit for frequency hopping may be substituted by the instruction bit for space hopping, or the instruction bit for frequency hopping and the instruction bit for space hopping may be provided, making it possible to set and control space hopping and frequency hopping. Therefore, it is possible to carry out a robust operation with only limited control information so as to obtain the space diversity effect or the frequency diversity effect.

Various modifications may be made as to notification of a control signal for space hopping: (1) when a resource allocation request is made from the transmitting device, a notification is constantly given from the receiving device to the transmitting device, (2) a setting of performing hopping is determined in advance in both the receiving device and the transmitting device, if possible, a control signal for space hopping is not notified such that space hopping is performed, (3) when an instruction is not particularly provided, space hopping is performed, and only when space hopping is not performed, a control signal for space hopping is notified, and the like.

Although in this embodiment, with regard to the setting of the ON/OFF state of space hopping and frequency hopping and the resource allocation, the receiving device has a leading role and issues an instruction to the transmitting device by the control signal, the transmitting device may perform the setting of the ON/OFF state of space hopping and frequency hopping and the resource allocation and may give a notification to the receiving device.

Fourth Embodiment

A fourth embodiment is an example where a part of the operation of the first embodiment is changed, and the method of pre-coding with CDD and PVS applied is changed. A user terminal of a mobile station which is a transmitting device allocated with a resource for space hopping transmits data through CDD pre-coding transmission with pre-coding weights in the slots having different amplitudes between transmitting antennas in the sub-frame of the resource block allocated to the local device. Here, the base station operates to allocate a plurality of users to the resource for space hopping. Then, the pre-coding weights to be applied to the resources of the transmitting antennas are switched in the first half slot and the second half slot between the antennas. The base station which is a receiving device demodulates the signal from the user terminal in the slot unit for the sub-frame self-allocated to each user terminal.

With the above-described operation, interference between adjacent codes in the signal transmitted through CDD pre-coding transmission differs between the first half slot and the second half slot, making it possible to randomize interference which is applied to other user terminals multiplexed by using adjacent codes.

Figure 14:
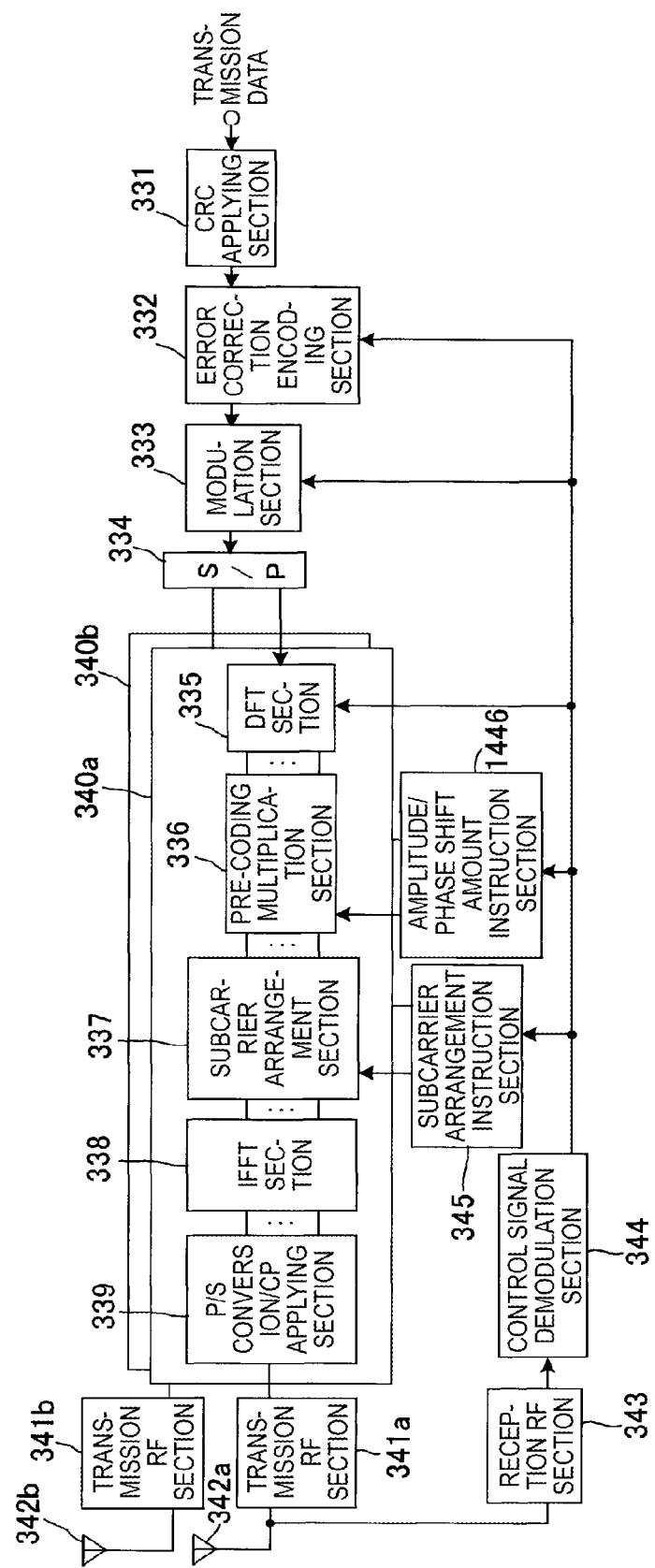
FIG. 14 is a block diagram showing the configuration of a main part of a transmitting device for use in a fourth embodiment of the invention.

FIG. 14 is a block diagram showing the configuration of a main part of a transmitting device for use in the fourth embodiment of the invention. The transmitting device of the fourth embodiment includes an amplitude/phase shift amount instruction section 1446, instead of the phase shift amount instruction section 346 of the first embodiment shown in FIG. 3. The amplitude/phase shift amount instruction section 1446 is configured to issue an instruction to the pre-coding multi-plication section 336. An example of a pre-coding weight at this time is expressed by the following expression (3).

[Expression 3]

$$W_0 = \begin{bmatrix} A \\ \sqrt{1-A^2} \cdot e^{j2\pi\frac{f}{N}} \end{bmatrix}, \quad W_1 = \begin{bmatrix} \sqrt{1-A^2} \\ -A \cdot e^{j2\pi\left(\frac{f}{N}\right)} \end{bmatrix} = \begin{bmatrix} \sqrt{1-A^2} \\ A \cdot e^{j2\pi\left(\frac{f}{N}+\frac{1}{2}\right)} \end{bmatrix} \quad (3)$$

Figure 15:
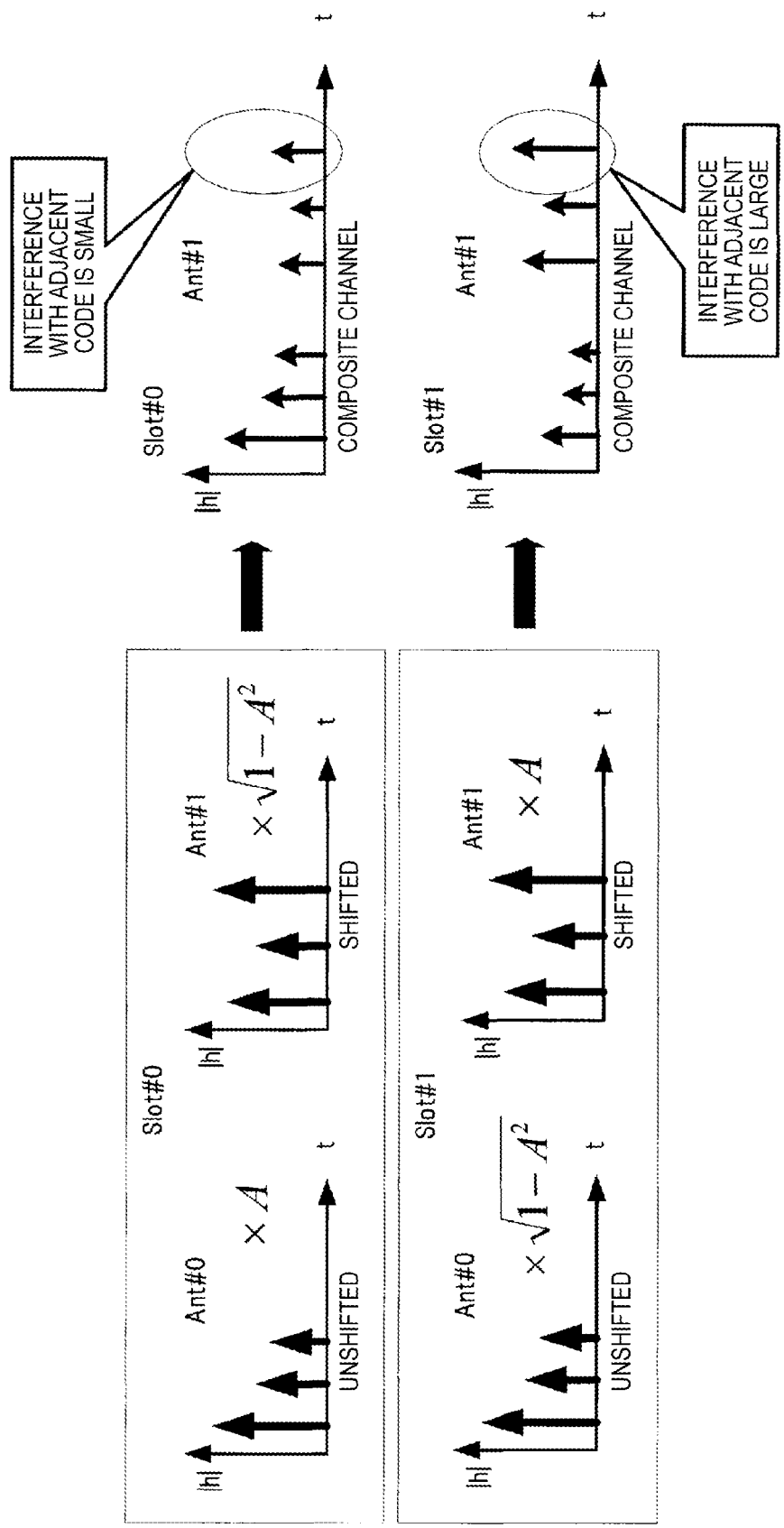
FIG. 15 is a diagram schematically showing a first operation example in the fourth embodiment.

It is assumed that A which controls amplitude is a pre-defined value or a value which is separately notified from the base station. FIG. 15 shows a specific operation example at this time. FIG. 15 is a diagram schematically showing a first operation example of the fourth embodiment.

In this operation example, for example, it is assumed that the magnitude of a signal component with long delay time is small in Ant#0 (for example, the antenna 342a) which is a first antenna, and the magnitude of a signal component with long delay time is reversely large in Ant#1 (for example, the antenna 342b) which is a second antenna. Here, if the value of A is set small and the condition A<√(1−A²) is established, as shown in FIG. 15, the signal component with long delay time of Ant#1 is multiplied by a small value in the first half slot Slot#0 compared to the second half slot Slot#1, such that a signal component to be observed becomes small. Thus, when a plurality of user terminals are multiplexed, an interference component to be applied to another user terminal which is adjacent in the time domain can differ between the first half slot Slot#0 and the second half slot Slot#1, obtaining the effect of randomizing interference. For example, in spatially multiplexing a plurality of user terminals, the SINR of a user terminal which is spatially multiplexed in a slot allocated with an inappropriate pre-coding weight is deteriorated, making it difficult to perform demodulation. In contrast, in this embodiment, the interference component is randomized in the above-described manner, reducing degradation of the SINR of the user terminal which is spatially multiplexed.

Figure 16:
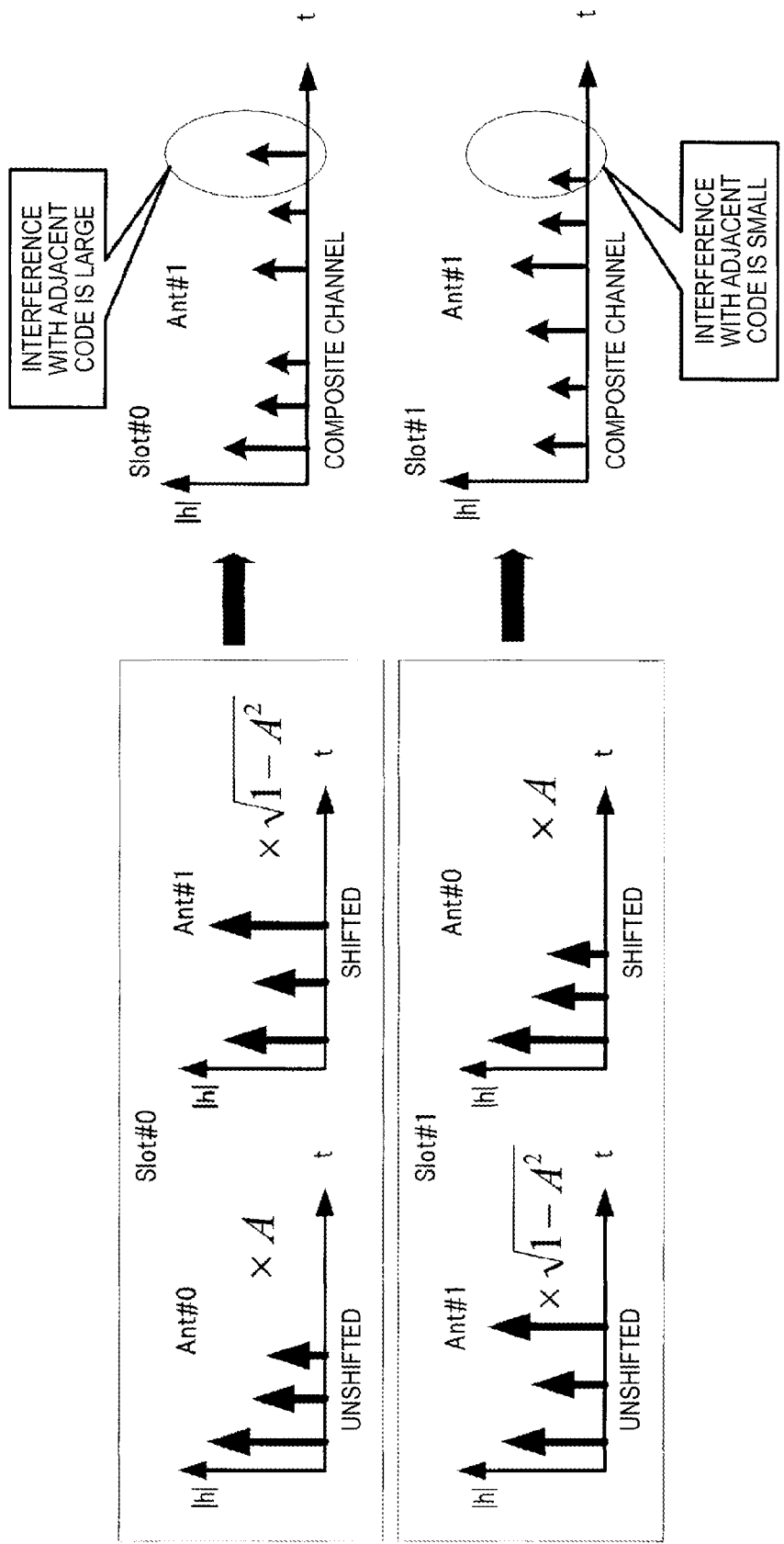
FIG. 16 is a diagram schematically showing a second operation example in the fourth embodiment.

FIG. 16 is a diagram schematically showing a second operation example of the fourth embodiment. Similarly to the above-described first operation example, a pre-coding weight is applied as expressed by the following expression (4), such that additional effects can be anticipated.

[Expression 4]

$$W_0 = \begin{bmatrix} A \\ \sqrt{1-A^2} \cdot e^{j2\pi\frac{f}{N}} \end{bmatrix}, \quad W_1 = \begin{bmatrix} -A \cdot e^{j2\pi\left(\frac{f}{N}\right)} \\ \sqrt{1-A^2} \end{bmatrix} \quad (4)$$

Specifically, in this embodiment, in applying the pre-coding weights with different amplitudes between the antennas, an operation is implemented to switch the delay amounts together. That is, the amplitudes and delay amounts by the pre-coding weights to be applied to the resources of the transmitting antennas are switched in the first half slot and the second half slot between the antennas. Thus, when a plurality of user terminals are multiplexed, as shown in FIG. 16, the effect of randomizing an interference component to be applied to another user terminal which is adjacent in the time domain is obtained.

In the pre-coding weight described in the expression (3) or the expression (4), A=1 may be set to implement an operation equivalent to antenna switching. Although, as described in the third embodiment, the procedure is carried out to give a notification with control information to which a resource is allocated for transmission of the user terminal, a reverse link, that is, a resource for reception of the user terminal which is used in association with a resource when an instruction is provided for reception of the user terminal may be set. An operation may be implemented which uses a plurality of pre-coding weights described in the expression (3) or the expression (4) with each transmission timing. This operation is expressed by the above-described expression as a configuration in which $W_{0i}=[W_0 W_1]$ is used in the slot #0 and $W_{1i}=[W_1 W_0]$ is used in the slot #1.

Although in the above-described embodiment, an example has been described where the invention is applied to the uplink from the mobile station to the base station in the cellular system, the invention may be appropriately applied to various radio communication systems, such as the downlink from the base station to the mobile station, insofar as a communication scheme is applicable.

The invention is not limited to the contents described in the above-described embodiments, and the invention also intends that changes and applications are made by those skilled in the art on the basis of techniques described in the description and the well-known art, and the changes and applications are included within the scope of protection.

Although in the above-described embodiments, an example has been described where the invention is configured by hardware, the invention may be implemented by software.

The respective functional blocks used for describing the above-described embodiments are implemented by an LSI which is typically an integrated circuit. The functional blocks may also be packed individually into a single chip or embodied as a single chip so as to include some or all of the functional blocks. Although the chip is embodied as an LSI, the chip is also referred to as an IC, a system LSI, a super LSI, or an ultra LSI in accordance with the degree of integration.

The technique for implementing an integrated circuit is not limited to the LSI, and may also be implemented by a dedicated circuit or a general-purpose processor. An FPGA (Field Programmable Gate Array) which can be programmed after an LSI is manufactured or a reconfigurable processor which is capable of reconfiguring connections or settings of circuit cells in an LSI may also be utilized.

If a technique of integrating a circuit which is substituted by an LSI emerges by means of another technique resultant from advancement or derivation of the semiconductor technique, the functional blocks may naturally be integrated using the technique. Application of biological techniques and the like is feasible.

This application is based on Japanese Patent Application (Japanese Patent Application No. 2008-202126) filed on Aug. 5, 2008 and Japanese Patent Application (Japanese Patent Application No. 2008-324610) filed on Dec. 19, 2008, the entire subject matters of which are incorporated herein by reference.

INDUSTRIAL APPLICABILITY

The invention has effects of obtaining the diversity effect in a plurality of slots while preventing complication of a scheduler or inefficient use of resources, eliminating the phenomenon in which the SINR significantly decreases in a specific slot, and avoiding deterioration of demodulation performance, and is useful as a radio communication device and a radio communication method which are applicable to a radio communication system, such as a cellular system.

REFERENCE SIGNS LIST

211: antenna
212: reception RF/FFT section
213: channel estimation section
214: frequency domain equalization section (FDE)
215: IDFT section
216: error correction decoding section
217: CRC detection section
218: channel estimation value storage section for first half slot
219: channel estimation value storage section for second half slot
220: hopping resource allocation section
221: control signal generation section
222: transmission RF section
331: CRC applying section
332: error correction encoding section
333: modulation section
334: S/P conversion section
335: DFT section
336: pre-coding multiplication section
337: subcarrier arrangement section
338: IFFT section
339: P/S conversion/CP applying section
340a, 340b: transmission signal generation section
341a, 341b: transmission RF section
342a, 342b: antenna
343: reception RF section
344: control signal demodulation section
345: subcarrier arrangement instruction section
346: phase shift amount instruction section
811: channel estimation value C1 storage section
812: channel estimation value C2 storage section
813: channel estimation value mapping control section
1446: amplitude/phase shift amount instruction section

The invention claimed is:

1. A radio communication device for use in a radio communication system, which performs transmission on a sub-frame basis having a first slot and a second slot temporally continuously arranged, the radio communication device comprising:
a pre-coding multiplication section that performs pre-coding to form a predetermined beam by multiplying a signal to be output to a plurality of antennas by a pre-coding weight, and uses cyclic delay diversity to shift a phase such that the phase in the pre-coding weight is cyclically changed on a frequency axis;
a phase shift amount instruction section that instructs that a phase shift amount to be applied by the pre-coding multiplication section is changed by $2\pi$ within an allocated resource block of the radio communication device, and assigns the phase shift amount for the pre-coding multiplication section such that the phase shift amount differs by $\pi$ between the first slot and the second slot in an allocated sub-frame of the radio communication device, wherein the first slot and the second slot are arranged continuously in time; and
a transmitting section that transmits a transmission signal including the signal subjected to the pre-coding to a receiving device as the other communication party.

2. The radio communication device according to claim 1, wherein the transmitting section performs communication based on SC-FDMA; and
wherein the phase shift amount instruction section assigns the phase shift amount such that the phase shift amount differs between SC-FDMA symbols.

3. The radio communication device according to claim 2, wherein the phase shift amount instruction section assigns the phase shift amount such that the phase shift amount differs by $\pi$ between an odd-numbered symbol and an even-numbered symbol of the SC-FDMA symbols.

4. The radio communication device according to claim 2, wherein the phase shift amount instruction section assigns the phase shift amount such that the phase shift amount is changed in a stepwise manner between the SC-FDMA symbols.

5. The radio communication device according to claim 1, further comprising:
a control signal demodulation section that demodulates a control signal including space hopping information for directing space hopping through the pre-coding,
wherein the phase shift amount instruction section and the pre-coding multiplication section perform the pre-coding to execute the space hopping in generating the transmission signal on the basis of the space hopping information.

6. The radio communication device according to claim 1, wherein the pre-coding uses pre-coding weights with different amplitudes between transmitting antennas.

7. The radio communication device according to claim 1, wherein the pre-coding weight to be applied by the pre-coding multiplication section is applied such that the amplitude and delay amount in the pre-coding weight differ between the first slot and the second slot.

8. A radio communication base station apparatus comprising the radio communication device according to claim 1.

9. A radio communication mobile station apparatus comprising the radio communication device according to claim 1.

10. A radio communication method in a radio communication system, which performs transmission on a sub-frame basis having a first slot and a second slot temporally continuously arranged, the radio communication method comprising:
a pre-coding multiplication step of performing pre-coding to form a predetermined beam by multiplying a signal to be output to a plurality of antennas by a pre-coding weight; and
a transmitting step of transmitting a transmission signal including the signal subjected to the pre-coding to a receiving device as the other communication party,
wherein, in the pre-coding multiplication step, a cyclic delay diversity is used to shift a phase in the pre-coding weight such that the phase in the pre-coding weight is cyclically changed on a frequency axis, the phase shift amount is set to change by $2\pi$ within an allocated resource block of a radio communication device, and the phase shift amount is set to differ by $\pi$ between the first slot and the second slot in an allocated sub-frame of the radio communication device, wherein the first slot and the second slot are arranged continuously in time.

* * * * *